(12) United States Patent
Din et al.

(10) Patent No.: US 12,413,259 B2
(45) Date of Patent: Sep. 9, 2025

(54) DIFFERENTIAL TRANSCEIVER SWITCH CIRCUITRY

(71) Applicant: Telefonaktiebolaget LM Ericsson (publ), Stockholm (SE)

(72) Inventors: Imad Ud Din, Flyinge (SE); Christian Elgaard, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 323 days.

(21) Appl. No.: 18/252,617

(22) PCT Filed: Nov. 27, 2020

(86) PCT No.: PCT/EP2020/083695
§ 371 (c)(1),
(2) Date: May 11, 2023

(87) PCT Pub. No.: WO2022/111814
PCT Pub. Date: Jun. 2, 2022

(65) Prior Publication Data
US 2024/0014846 A1 Jan. 11, 2024

(51) Int. Cl.
*H04B 1/48* (2006.01)
*H04B 1/401* (2015.01)

(52) U.S. Cl.
CPC .............. *H04B 1/48* (2013.01); *H04B 1/401* (2013.01)

(58) Field of Classification Search
CPC ............ H04B 1/401; H04B 1/48; H04B 1/44
See application file for complete search history.

(56) References Cited

U.S. PATENT DOCUMENTS 9,369,173 B1 6/2016 Yoon
10,389,358 B1 8/2019 Wang et al.
(Continued)

FOREIGN PATENT DOCUMENTS

CN 108566188 A 9/2018
JP 2011010137 A 1/2011
(Continued)

OTHER PUBLICATIONS

International Search Report and Written Opinion dated Jun. 7, 2021 for International Application No. PCT/EP2020/077431 filed Sep. 30, 2020, consisting of 8 pages.
(Continued)

*Primary Examiner* — Nguyen T Vo
(74) *Attorney, Agent, or Firm* — Weisberg I.P. Law, P.A.

(57) ABSTRACT

A differential transceiver switch circuitry having an antenna port, a positive and a negative receiver port, a first positive and a first negative amplifier port and at least one second positive and negative second amplifier port. The differential transceiver switch circuitry is configured to operate in a reception mode to allow reception signals at the antenna port to be transferred to the positive and negative receiver port and in a transmission mode to allow transmission signals at the first positive and first negative amplifier port and at the second positive and second negative amplifier port to be transferred to the antenna port. The differential transceiver switch circuitry has a transmit arrangement and a receive arrangement having receiver switch circuitry configured to prevent transmission signals from entering the receive arrangement in the transmission mode.

20 Claims, 11 Drawing Sheets

(56) References Cited

U.S. PATENT DOCUMENTS

| | | |
|---|---|---|
| 10,873,138 B2 | 12/2020 | Perumana et al. |
| 11,539,333 B2 | 12/2022 | Yang et al. |
| 2004/0185818 A1 | 9/2004 | Ha et al. |
| 2005/0255810 A1 | 11/2005 | Monroe |
| 2006/0094357 A1 | 5/2006 | McCorkle |
| 2007/0232241 A1 | 10/2007 | Carley et al. |
| 2007/0274238 A1 | 11/2007 | Kim |
| 2007/0279099 A1 | 12/2007 | Goddard et al. |
| 2008/0310382 A1 | 12/2008 | Nakagawa et al. |
| 2011/0143690 A1 | 6/2011 | Jerng et al. |
| 2013/0331043 A1 | 12/2013 | Perumana et al. |
| 2014/0120968 A1 | 5/2014 | Mahmood |
| 2014/0124908 A1 | 5/2014 | Sameshima et al. |
| 2016/0028432 A1 | 1/2016 | Zhang et al. |
| 2019/0158047 A1 | 5/2019 | Watkins |
| 2020/0083924 A1 | 3/2020 | Callendar et al. |
| 2020/0274575 A1* | 8/2020 | Yang .................. H04L 5/16 |

FOREIGN PATENT DOCUMENTS

| | | |
|---|---|---|
| JP | 2011211589 A | 10/2011 |
| WO | 2018077409 A1 | 5/2018 |
| WO | 2019057299 A1 | 3/2019 |
| WO | 2021259495 A1 | 12/2021 |

OTHER PUBLICATIONS

International Search Report and Written Opinion dated Jun. 18, 2021 for International Application No. PCT/EP2020/077432 filed Sep. 30, 2020, consisting of 8 pages.

International Search Report and Written Opinion dated Jul. 8, 2021 for International Application No. PCT/EP2020/083695 filed Nov. 27, 2020, consisting of 10 pages.

Notice of Allowance dated May 19, 2025 for U.S. Appl. No. 18/245,985, filed Mar. 20, 2023, consisting of 17 pages.

Non-Final Office Action issued in U.S. Appl. No. 18/245,964, dated May 19, 2025, consisting of 42 pages.

* cited by examiner

DIFFERENTIAL TRANSCEIVER SWITCH CIRCUITRY

CROSS-REFERENCE TO RELATED APPLICATION

This application is a Submission Under 35 U.S.C. § 371 for U.S. National Stage Patent Application of International Application Number: PCT/EP2020/083695, filed Nov. 27, 2020 entitled "DIFFERENTIAL TRANSCEIVER SWITCH CIRCUITRY," the entirety of which is incorporated herein by reference.

TECHNICAL FIELD

The present disclosure relates to the field of transceiver switch circuitry, especially for transceivers for wireless communication and nodes using such transceivers.

BACKGROUND

Tx/Rx Isolators (or transceiver, TRX, Switches) are used in communication transceivers to connect the transmitter/receiver circuitry with the antenna and to protect the receiver circuitry from the PA output signal. If the Tx signal reaches the Rx port without attenuation, the high amplitude may destroy the sensitive receiver inputs. The following describes the basic functions of a Tx/Rx isolator.

FIGS. 1a and 1b illustrate a transceiver switch 10, which includes a transmitter circuitry 12, a receiver circuitry 13, an antenna 11, a transmitter switch 5 and a receiver switch 6.

FIG. 1a shows a transceiver switch 10 in transmission, Tx, mode. The transmitter switch 5 is in an ON state or is closed so it presents a low impedance and the transmission signal generated in the transmitter circuitry 12 gets through to the antenna 11, as indicated by the dashed arrow 2. However, the receiver switch 6 is in an OFF state or is open and presents a large impedance compared to the receiver input impedance. As a result, most of the transmitter voltage swing drops across the open receiver switch 6 instead of the receiver input thus protecting the input of the receiver circuitry 13 from damage.

FIG. 1b shows the transceiver switch 10 in reception, Rx, mode. The transmitter switch 5 is in an OFF state in order to stop the received antenna signal from flowing to the transmitter output at the transmitter circuitry 12 (and increasing the Rx insertion loss). The receiver switch 6 is in ON state, presenting a low impedance to the signal from the antenna 11 as indicated by the dashed arrow 3 to the receiver circuitry 13.

Many radio systems, such as 4G and 5G, use modulated signals with high peak to average ratio, PAR, which is a cause of low overall efficiency at average (or back-off) output power. One of the main blocks responsible for this low efficiency at back-off is the power amplifier. One way of improving this, as exploited by the Doherty PA structure, is to use load modulation to achieve a higher power added efficiency, PAE, at average output power levels.

FIG. 2a shows one possible implementation of a Doherty amplifier 20. The Doherty amplifier 20 as seen in FIG. 2a comprises a main amplifier 21 and an auxiliary, aux, amplifier 22. The main amplifier 21 drives a transmission line 23 with a phase of 0°. The aux amplifier 22 is OFF until the input signal strength reaches a certain threshold, so that the main amplifier 21 is solely responsible for driving the transmission line 23 with characteristic impedance $Z_1$.

As the input signal strength rises above the threshold, the aux amplifier 22 starts driving the node, marked with "a", between the transmission line 23 and the antenna 11 with a phase of 90° relative to the main amplifier 21. The output impedance of the main amplifier 21 is reduced due to load modulation as the signal amplitude increases, so the power amplifier can deliver high output power to the antenna 11.

Typically, the value of the transmission line impedance $Z_1$, as shown in FIG. 2a, is higher than 50Ω for the load modulation to work in node "a" while matching to the antenna impedance, which typically is 50Ω. High voltage levels exists at node "a" (which is the same as node "b").

Devices in modern Complementary Metal Oxide Semiconductor, CMOS, processes are unable to sustain large voltages. If high power levels are expected to be delivered by a power amplifier implemented in such a technology, it may become necessary to reduce the load impedance to limit the voltage levels at peak output power.

FIG. 2b shows an implementation of a Doherty amplifier 25. In the configuration of the Doherty amplifier 25 shown in FIG. 2b, a quarter wavelength transmission line 26 shown as $Z_2$ is added to the Doherty amplifier 20 of FIG. 2a in order to achieve a degree of freedom, which matches the impedance in node "a" to the antenna impedance.

This makes it possible to choose a low impedance value in node "a", which is needed when the impedance $Z_1$ cannot be made very high.

In radio frequency, RF, transceivers, both the transmission and reception circuits are connected to the antenna. In modern CMOS technologies, the thin oxide gates can typically tolerate only a limited voltage, meaning that high voltage levels at the RF input can damage the Low Noise Amplifier, LNA, of the receiver. In time division duplexing, TDD, systems, the PA and the LNA are typically connected to a transceiver (or TRX) switch that directs the signal either from the PA to antenna in Tx mode or from antenna to LNA in Rx mode, as illustrated in FIGS. 1a and 1b. Since high voltage levels exist at the antenna node, the switch must isolate the LNA from the antenna during TX mode, such that these high signal levels do not reach the LNA input.

In order to work properly as part of a 5G mm-wave transceiver, a transceiver must have low Tx insertion loss, low Rx insertion loss, high linearity and wide bandwidth.

Non-linearity of the TRX switch can result in poor Adjacent Channel Leakage Ratio, ACLR, at the antenna, compromising the error vector magnitude, EVM, and thus the performance of the transmitter. CMOS switches in current technologies are non-linear when operating with large voltage levels. The TRX switch should be much more linear than the PA in order not to be the dominant source of non-linearity in the Tx mode.

In distributed amplifiers, such as Doherty Amplifiers, typically, low output impedance (due to, for example, load modulation) is used to provide high power output while remaining within the safe voltage operating limits dictated by technology. A switch with integrated impedance matching of a low output impedance PA to a 50 Ohm antenna is desirable.

Traditionally, a switch is a separate block that causes some attenuation of the wanted signal due to its insertion loss. This loss typically comes from the internal components in the switch structure, for example, lossy transmission line segments or the CMOS devices used a switch. During Tx operation, any loss in the Tx to antenna path will affect the efficiency of the transmitter.

External components have traditionally been used for implementing the TRX functionality. However, this may not be feasible for mm-wave solutions due to package losses and high restrictions on board area when the solution should be used in an antenna array.

Solutions with integrated transceiver switch circuitry rely on CMOS switches to provide the isolation during Tx mode. Due to high voltage swing at the Tx output, multiple switches usually must be stacked in order to avoid breakdown. However, many stacked switches may result in high insertion loss during the Rx operation. A small number of stacked switches, on the other hand, may result in a solution that is quite non-linear in the Tx mode. Normally integrated switches are narrow-band and have limited filtering of the spurious emissions from the PA.

In most conventional solutions, a TRX switch is added between the PA and the antenna port, which results in losses, lowering the maximum output power that the DPA can deliver as well as the efficiency of the transmitter.

SUMMARY

An object of the present disclosure is to provide a transceiver switch circuitry which seeks to mitigate, alleviate, or eliminate one or more of the above-identified deficiencies in the art and disadvantages singly or in any combination and to provide an improved transceiver switch with low insertion loss for distributed power amplifiers.

This object is obtained by a differential transceiver switch circuitry based on $\lambda/4$ transmission lines implemented with traditional Power Amplifiers, PA, (e.g. Doherty Amplifiers as shown in FIG. 2b), the Doherty Amplifier being modified such that the output of the main amplifier 21 is connected to the receiver 13 using a $\lambda/4$ transmission line, with a transistor switch at the receiver side. By doing this, a $\lambda/4$ transmission line between the main amplifier and the auxiliary amplifier will produce a wanted impedance up-conversion in receiver mode resulting in high voltage swing and low noise figure in Rx mode.

According to an aspect, a differential transceiver switch circuitry for a differential transceiver is provided. The differential transceiver switch circuitry comprises an antenna port, a positive and a negative receiver port, a first positive and a first negative amplifier port and at least one second positive and negative second amplifier port. The antenna port is connectable to an antenna. The positive and a negative receiver port is connectable to a receiver circuitry. The first positive and the first negative amplifier port are connectable to a respective first positive and first negative amplifier circuitry. The at least one second positive and negative second amplifier port are connectable to a respective second positive and second negative amplifier circuitry. The differential transceiver switch circuitry is configured to be operable in a reception mode to allow reception signals at the antenna port to be transferred to the positive and negative receiver port. The differential transceiver switch circuitry is further configured to be operable in a transmission mode to allow transmission signals at the first positive and first negative amplifier port and at the second positive and second negative amplifier port to be transferred to the antenna port for transmission. The transmission signals have a transmission center frequency with a wavelength, A, and the reception signals have a reception center frequency within ten percent of the transmission center frequency. The differential transceiver switch circuitry further comprises a balun comprising an antenna side and a transceiver side. The antenna side comprises a first connection point connectable to the antenna port and a second connection point connectable to a ground potential. The transceiver side comprises a feeding point connectable to a direct current, DC, power supply, Vdd, and two symmetrically arranged transceiver connection points. The differential transceiver further comprises a transmit arrangement comprising a positive transmission path and a negative transmission path, said positive and negative transmission paths being symmetrical. Each transmission path comprises a first quarter wavelength, $\lambda/4$, impedance converter having a first side connected to a respective one of the two symmetrically arranged transceiver connection points. Each transmission path further comprises a respective first amplifier port being connected to a second side of the first quarter wavelength, $\lambda/4$, impedance converter via a first transmitter switch circuitry. Each transmission path further comprises a respective at least one second amplifier port being connected to the first side of the first quarter wavelength, $\lambda/4$, impedance converter via a second transmitter switch circuitry. The respective first transmitter switch circuitry and the respective second transmitter switch circuitry are configured to disconnect the respective first amplifier ports and the respective at least one second amplifier ports from the respective quarter wavelength, $\lambda/4$, impedance converter in the reception mode. The differential transceiver further comprises a receive arrangement connected between the transmit arrangement and the positive receiver port and the negative receiver port. The receive arrangement comprises a receiver switch circuitry configured to prevent transmission signals to enter the receive arrangement, at least at the transmission center frequency, in the transmission mode.

According to another aspect, a differential transceiver for wireless communication is provided. The differential transceiver switch circuitry is connectable to an antenna via an antenna port for transmitting transmission signals during transmission mode, and receiving reception signals during reception mode. The differential transceiver switch circuitry comprises a differential first amplifier connected to positive and negative first amplifier ports of the differential transceiver switch circuitry and a differential second amplifier connected to positive and negative second amplifier port of the differential transceiver switch circuitry. The first amplifier and second amplifier are configured to generate transmission signals. The differential transceiver switch circuitry comprises a receiver connected to positive and negative reception ports of the differential transceiver switch circuitry and being configured to receive reception signals.

Advantageously, the differential transceiver switch re-uses the transmission lines and the amplifiers of the Doherty PA such that it significantly reduces Tx insertion loss. This improves the efficiency and power output of the PA in Tx mode. In addition, it shows low loss and, importantly, produces a wanted impedance up-conversion in receiver mode resulting in high voltage swing and low noise figure in Rx mode. The $\lambda/4$ transmission line between the output of the main amplifier and the Rx port can be used to absorb the output capacitance at the main amplifier.

Advantageously, the differential transceiver switch reduces the need for implementation of stacked MOS devices in the circuits by allowing placement of such devices in nodes that see smaller voltage swings than those present at the antenna. Lesser (or no) requirement to stack devices, improves transmitter insertion loss and results in a higher transformed impedance over a $\lambda/4$ line, thereby also improving receiver insertion loss.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
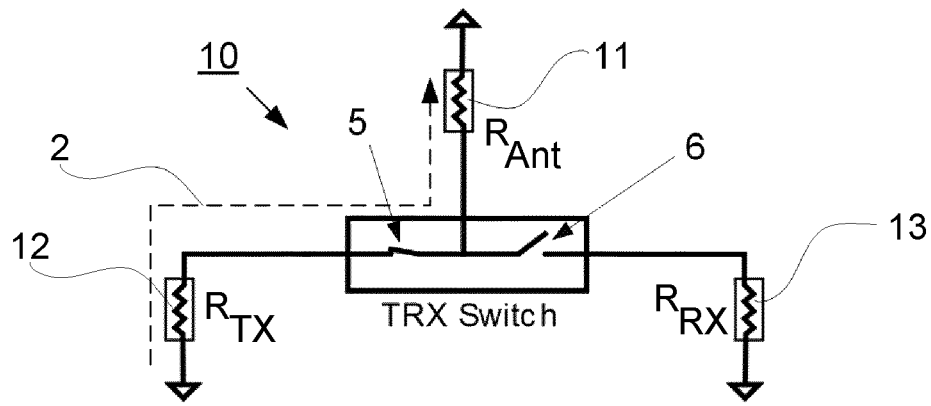
FIGS. 1a and 1b illustrate the functionality in a prior art transceiver switch.

Aspects of the present disclosure will be described more fully hereinafter with reference to the accompanying drawings. The apparatus disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Some of the example embodiments presented herein are directed towards a transceiver switch. As part of the development of the example embodiments presented herein, a problem will first be identified and discussed.

Figure 1B:
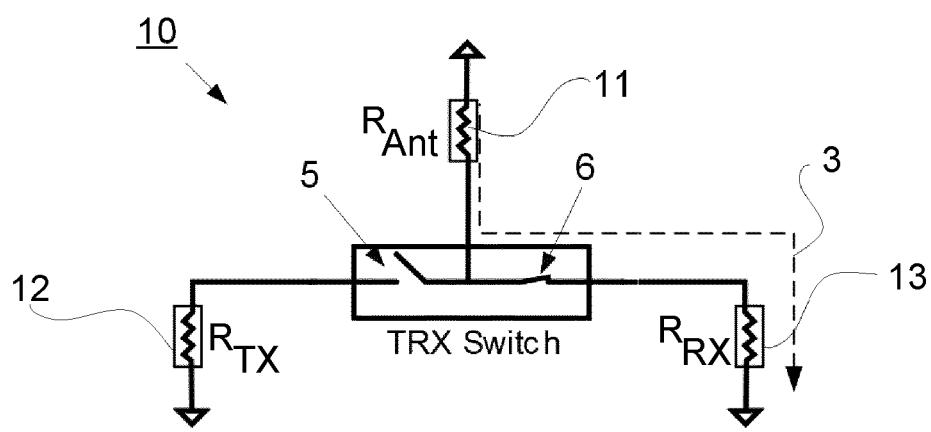

As mentioned above, FIGS. 1a and 1b describe the functionality of a prior art transceiver switch circuitry 10. Certain drawbacks have been identified for a transceiver to be suitable for use in 5G mm-wave transceivers, such as high insertion loss, low linearity or low bandwidth.

A high transmitter insertion loss results in low efficiency of the transmitter while a high receiver insertion loss results in loss of sensitivity for the receiver.

Low linearity of the transceiver may result in poor adjacent channel leakage power ratio, ACLR, at the antenna, compromising the error vector magnitude, EVM, and thus the performance of the transceiver. Complementary metal oxide semiconductor, CMOS, switches in current technology are quite non-linear when operating with large voltage swings. The TRX switch should be much more linear than the power amplifier, PA, in order not to be the dominant source of out-of-band spurious emissions in the Tx mode.

A wide bandwidth is highly desirable in mm-wave systems. If a switch has bandwidth enough that it covers a complete band, or potentially multiple bands, it is possible to reduce the cost and complexity of developing different variants of a product that operate in different sub-bands of the 3GPP frequency band.

In addition, it is highly desirable that the switch should have integrated filtering functionality to reduce or eliminate dependence on external filtering to meet 3GPP out-of-band spurious requirements.

In order to provide a high-power output with good back-off efficiency at mm-wave frequencies, many circuits use distributed amplifiers such as Doherty Amplifier. In such amplifiers, low output impedance is typically used to provide high power output while remaining within the safe voltage operating limits dictated by technology. A switch with integrated impedance matching of a low output impedance PA to a 50Ω antenna is desirable.

Figure 2B:
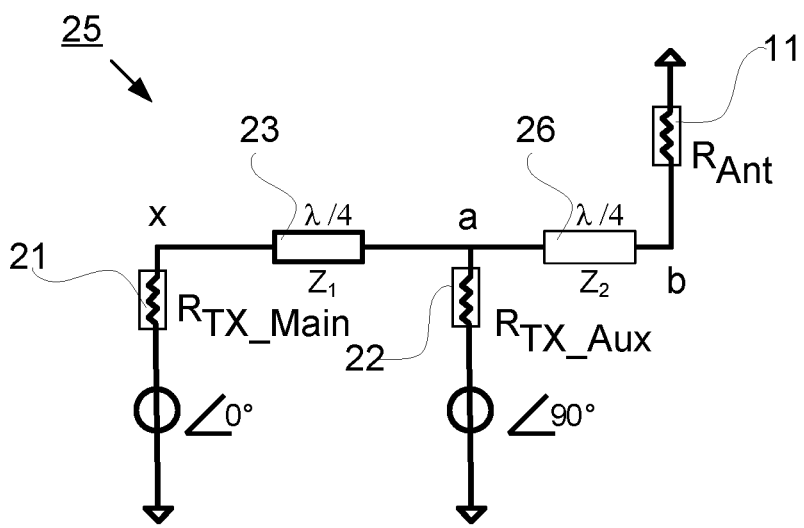
Figure 3:
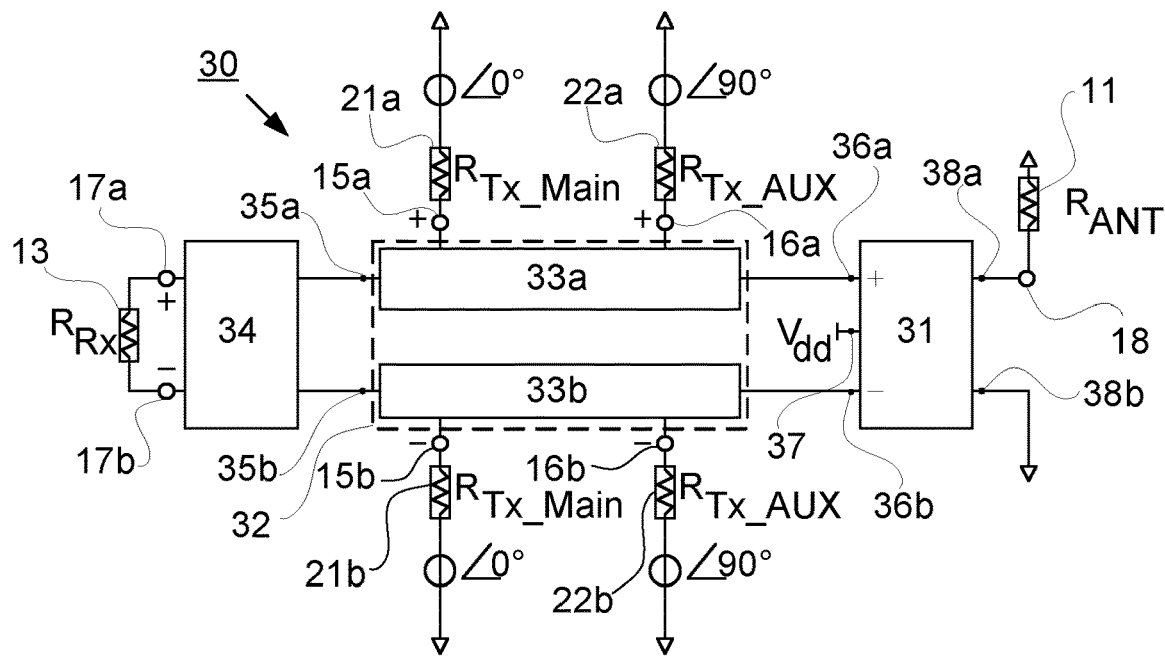
FIG. 3 illustrates the configuration of an example differential transceiver switch circuitry.

FIG. 3 illustrates the functionality of an example differential transceiver switch circuitry 30. The differential transceiver switch circuitry 30 is based on λ/4 transmission lines implemented with a traditional Doherty amplifier along with other components. The differential transceiver switch circuitry 30 allows the transmission of signals from the transmitter circuitry to the antenna during transmission mode and reception of signals from the antenna to the receiver circuitry during reception mode while ensuring low or almost zero transmission insertion loss and reception insertion loss, high transmission to reception isolation and high linearity. The low or almost zero transmission insertion loss and reception insertion loss, high transmission to reception isolation and high linearity is achieved by implementing a Doherty amplifier such as the Doherty amplifier 25 shown in FIG. 2b with some modifications. The modification of the traditional Doherty Amplifier allows for the output of the main amplifier 21 to be connected to the receiver 13 using a quarter wavelength, λ/4, impedance converter with a transistor switch at the receiver side. By doing this, a quarter wavelength, λ/4, impedance converter between the auxiliary amplifier 22 and the main amplifier 21 will produce a wanted impedance up-conversion at the receiver port resulting in high voltage swing and low noise figure in receiver mode. The λ/4 transmission line which connects the output of the main amplifier 21 and the Rx port can be used to absorb the output capacitance at the main amplifier 21.

Increasing impedance level is desirable in Rx mode. For a given noise and signal power, higher impedance increases the voltage level of both the signal and noise so that the signal to noise ratio stays the same. This will make the voltage noise originating from the input source, to appear lower when compared with the input referred voltage noise of the LNA, than if the impedance level were lower. In other words, the noise figure will go down as the added noise from the LNA is compared to a higher input noise source, but the signal to noise ratio stays unchanged. The Noise Figure, NF, expressed in dB is shown in the equation below.

$$NF = 10\text{Log}\left(\frac{SNR_i}{SNR_o}\right) = 10\text{Log}\left(\frac{S_{vnRs} + S_{vnLNA}}{S_{vnRs}}\right) = 10\text{Log}\left(1 + \frac{S_{vnLNA}}{S_{vnRs}}\right) \quad (1)$$

where $SNR_i$ is the Signal to Noise Ratio for input signal; $SNR_o$ is the Signal to Noise Ratio for output signal; $S_{vnRs}$ is the Power Spectral Density of input noise source; and $S_{vnLNA}$ is the Power Spectral Density of equivalent added input referred Noise from Low Noise Amplifier, LNA.

A requirement for the above-mentioned statements to be true is that the LNA can be designed for the higher impedance level. If not, the noise figure may degrade, for instance if a particular LNA has an optimum source resistance closer to a lower impedance level. However, it is likely that this is true, especially when increasing the impedance level from a typical 50-ohm input impedance level.

Increased signal level could reduce linearity of the LNA. However, this can easily be compensated by reducing the gain of the LNA since the dominant non-linearity contributor can be assumed to be at the output of the LNA or in the following stage.

The terms differential transceiver switch and differential transceiver switch circuitry are interchangeably used throughout the description.

The differential transceiver switch circuitry 30 as shown in FIG. 3 comprises an antenna port 18, a positive receiver port 17a and a negative receiver port 17b, a first positive amplifier port 15a and a first negative amplifier port 15b and at least one second positive amplifier port 16a and a second negative amplifier port 16b. The antenna port 18 is connectable to an antenna 11. The positive receiver port 17a and the negative receiver port 17b are connectable to the receiver circuitry 13. The first positive amplifier port 15a and a first negative amplifier port 15b are connectable to a respective first positive amplifier circuitry 21a and first negative amplifier circuitry 21b. The at least one second positive amplifier port 16a and a second negative amplifier port 16b are connectable to a respective second positive amplifier circuitry 22a and a second negative amplifier circuitry 22b.

The differential transceiver switch circuitry 30 comprises a balun 31. The balun 31 is implemented in order to connect a fully differential transceiver to a single ended antenna. The balun 31 comprises an antenna side and a transceiver side. The antenna side comprises a first connection point 38a connectable to the antenna port 18 and a second connection point 38b, which is connectable to a ground potential. The transceiver side comprises a feeding point 37 connectable to a direct current, DC, power supply, Vdd, and two symmetrically arranged transceiver connection points 36a, 36b.

The differential transceiver switch circuitry 30 further comprises a transmit arrangement 32. The transmit arrangement 32 comprises a positive transmission path 33a and a negative transmission path 33b. The positive and negative transmission paths 33a, 33b are symmetrical. Each transmission path comprises a first quarter wavelength, λ/4, impedance converter (as illustrated in e.g. FIG. 7a), a respective first amplifier port 15a, 15b and a respective at least one second amplifier port 16a, 16b. The first quarter wavelength, λ/4, impedance converter has a first side connected to a respective one of the two symmetrically arranged transceiver connection points 36a, 36b. The respective first amplifier port 15a, 15b are connected to a second side of the first quarter wavelength, λ/4, impedance converter via a first transmitter switch circuitry (as illustrated in e.g. FIG. 7a). The respective at least one second amplifier port 16a, 16b are connected to the first side of the first quarter wavelength, λ/4, impedance converter via a second transmitter switch circuitry (as illustrated in e.g. FIG. 7a).

The respective first transmitter switch circuitry and the respective second transmitter switch circuitry are configured to disconnect the respective first amplifier ports 15a, 15b and the respective at least one second amplifier ports 16a, 16b from the respective quarter wavelength, λ/4, impedance converter in a reception mode. This will be described in details with reference to FIG. 7a.

The respective first transmitter switch circuitry and the respective second transmitter switch circuitry are configured to connect the respective first amplifier ports 15a, 15b and the respective at least one second amplifier ports 16a, 16b from the respective quarter wavelength, λ/4, impedance converter in a transmission mode. This will be described in details with reference to FIG. 7b.

The differential transceiver switch circuitry 30 further comprises a receive arrangement 34. The receive arrangement 34 is connected between the transmit arrangement 32 and the positive receiver port 17a and the negative receiver port 17b. The receiver arrangement 34 comprises a receiver switch circuitry configured to prevent transmission signals to enter the receive arrangement, at least at the transmission center frequency, in the transmission mode. Another functionality of the receiver arrangement 34 may be to stop DC voltage Vdd from reaching the gate of the LNA, for example by using DC blocking capacitors.

The differential transceiver switch circuitry 30 is configured to be operable in a reception mode to allow reception signals (denoted as 71 in FIGS. 7a and 8a) at the antenna port 18 to be transferred to the positive and negative receiver port 17a, 17b. The differential transceiver switch circuitry 30 is configured to be operable in a transmission mode to allow transmission signals (denoted as 72 in FIGS. 7b and 8b) at the first positive and first negative amplifier port 15a, 15b and at the second positive and second negative amplifier port 16a, 16b to be transferred to the antenna port 18 for transmission. The transmission signals 72 have a transmission center frequency with a wavelength, A. The reception signals 71 have a reception center frequency within ten percent of the transmission center frequency. It should be noted that in this description the reception signals as well as the transmission signals are differential signals.

In a TDD system, the reception signals have the same center frequency as the transmission signals or the reception center frequency is equal to the transmission center frequency. However, the transceiver switch circuitry could also be used for a half-duplex system like GSM if transmission and reception frequencies are close enough (say within 10% of the carrier frequency) so that the wavelength, A, is a good approximation for both transmit and receive frequencies. During transmission, the transmission signals are prevented from entering the receiver due to the fact that the electrical length of the first transmission line is adapted to the center frequency of the transmission signals. During reception, the electrical length of the second transmission line should be adapted to the center frequency of the reception signals. Insertion loss will be high if the difference in center frequency between the transmission signals and the reception signals is too high, i.e. >10%. It should be noted that TRX switches are used in TDD systems, where Tx and Rx typically operate in the same frequency band.

According to some embodiments, the receive arrangement 34 comprises a positive input point connected to the second side of the first quarter wavelength, $\lambda/4$, impedance converter of the positive transmission path 33a of the transmit arrangement 32. The receive arrangement 34 further comprises a negative input point 35b connected to the second side of the first quarter wavelength, $\lambda/4$, impedance converter of the negative transmission path 33b of the transmit arrangement 32.

Figure 2A:
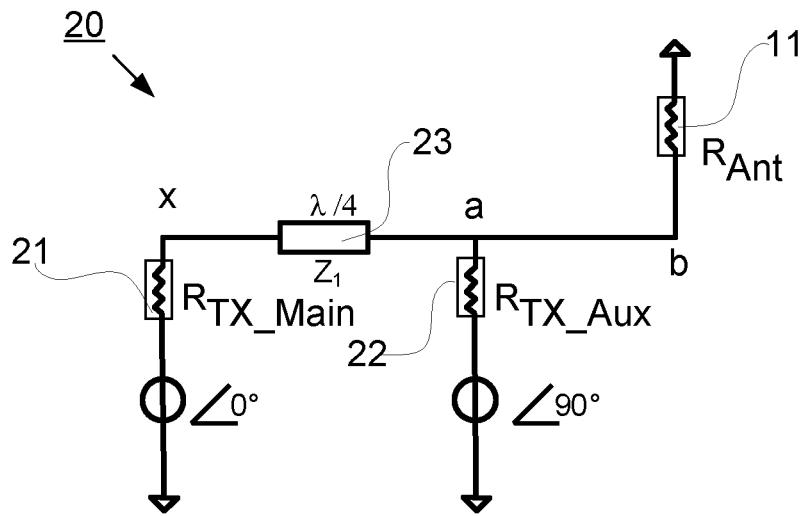
FIGS. 2a and 2b illustrate different implementations of Distributed Power Amplifiers, DPA.

In this description, the first positive and first negative amplifier circuitry (21a, 21b) corresponds to the main amplifier 21 and the second positive and second negative amplifier circuitry (22a, 22b) corresponds to the aux amplifier 22 of FIGS. 2a and 2b. The receiver circuitry 13 refers to the receiver circuitry 13 of FIGS. 1a and 1b and the antenna 11 refers to the antenna 11 of FIGS. 1a and 1b.

Figure 4:
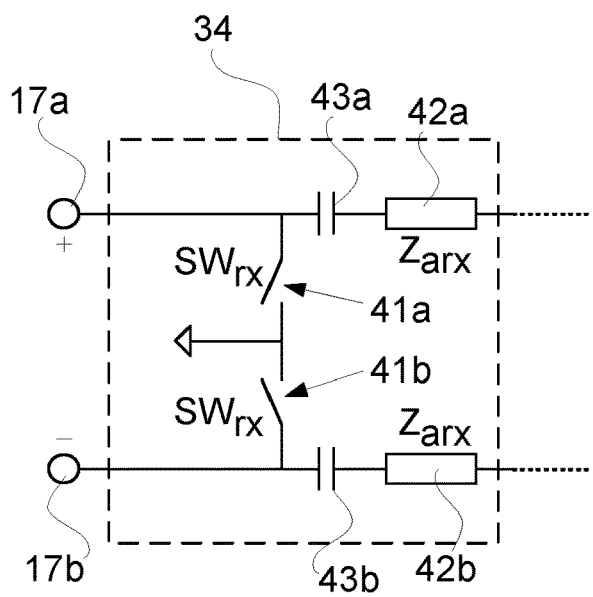
FIG. 4 illustrates a configuration of a receive arrangement of the differential transceiver switch circuitry.

FIG. 4 illustrates an example configuration of the receive arrangement 34. The receive arrangement 34 comprises a positive second quarter wavelength, $\lambda/4$, impedance converter 42a and a negative second quarter wavelength, $\lambda/4$, impedance converter 42b. Each second quarter wavelength, $\lambda/4$, impedance converter 42a, 42b is connected between the respective receiver port 17a, 17b and the respective transmission path 33a, 33b of the transmit arrangement 32. The receiver switch circuitry further comprises a positive receiver switch 41a connected between the positive receiver port 17a and the ground potential and a negative receiver switch 41b connected between the negative receiver port 17b and the ground potential. The positive and negative receiver switches 41a, 41b are configured to be closed in the transmission mode.

Capacitors 43a and 43b are implemented in series with the respective second quarter wavelength, $\lambda/4$, impedance converter 42a, 42b to stop DC voltage Vdd from reaching the gate of the LNA during reception mode.

Figure 5:
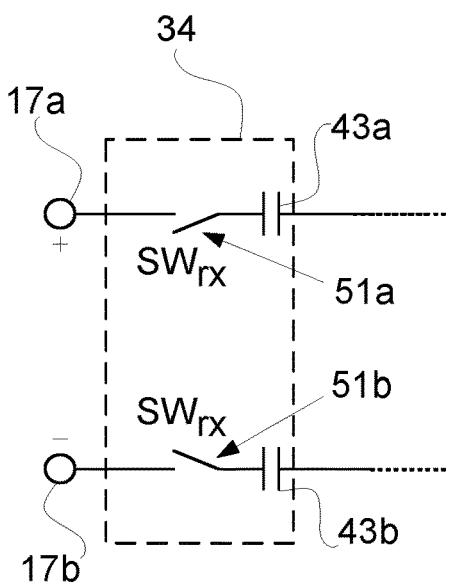
FIG. 5 illustrates another configuration of a receive arrangement of the differential transceiver switch circuitry.

FIG. 5 illustrates another example configuration of the receive arrangement 34. The receive arrangement 34 comprises a positive in-line receiver switch 51a connected between the positive receiver port 17a and the respective transmission path 33a, 33b of the transmit arrangement 32 and a negative in-line receiver switch 51b connected between the negative receiver port 17b and the respective transmission path 33a, 33b of the transmit arrangement 32. Capacitors 43a and 43b are implemented in series with the respective in-line receiver switch 51a, 51b to stop DC voltage Vdd from reaching the gate of the LNA during reception mode. The positive and negative in-line receiver switches 51a, 51b are configured to be open in the transmission mode.

Figure 6:
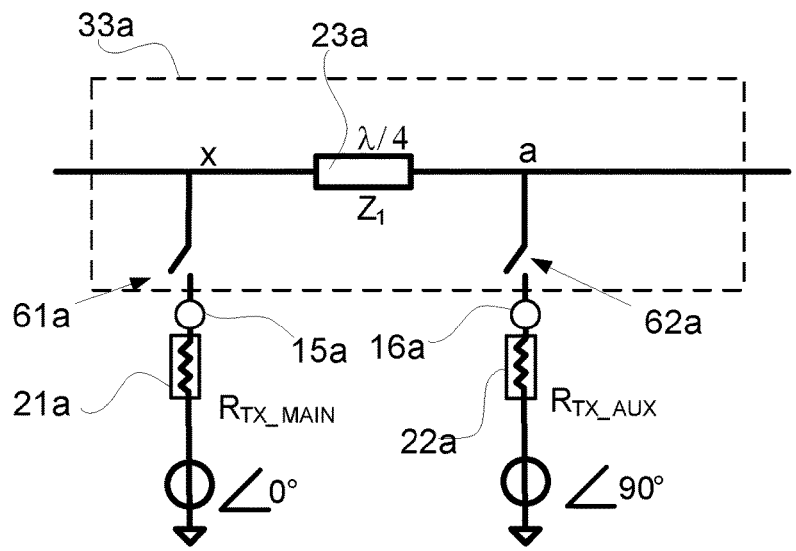
FIG. 6 illustrates a configuration of a transmit arrangement of the differential transceiver switch circuitry.

FIG. 6 illustrates the positive transmission path 33a of the transmit arrangement 32 in a Rx mode. The first amplifier port 15a is connected to a second side of the first quarter wavelength, $\lambda/4$, impedance converter 23a via the first transmitter switch circuitry 61a. The respective at least one second amplifier port 16a is connected to the first side of the first quarter wavelength, $\lambda/4$, impedance converter 23a via the second transmitter switch circuitry 62a. The respective first transmitter switch circuitry 61a and the respective second transmitter switch circuitry 62a are configured to disconnect the respective first amplifier port 15a and the respective at least one second amplifier port 16a from the respective quarter wavelength, $\lambda/4$, impedance converter 23a in a reception mode. Alternatively or additionally, the respective first transmitter switch circuitry 61a and the respective second transmitter switch circuitry 62a are configured to connect the respective first amplifier ports 15a and the respective at least one second amplifier ports 16a from the respective quarter wavelength, $\lambda/4$, impedance converter 23a in transmission mode.

Figure 7A:
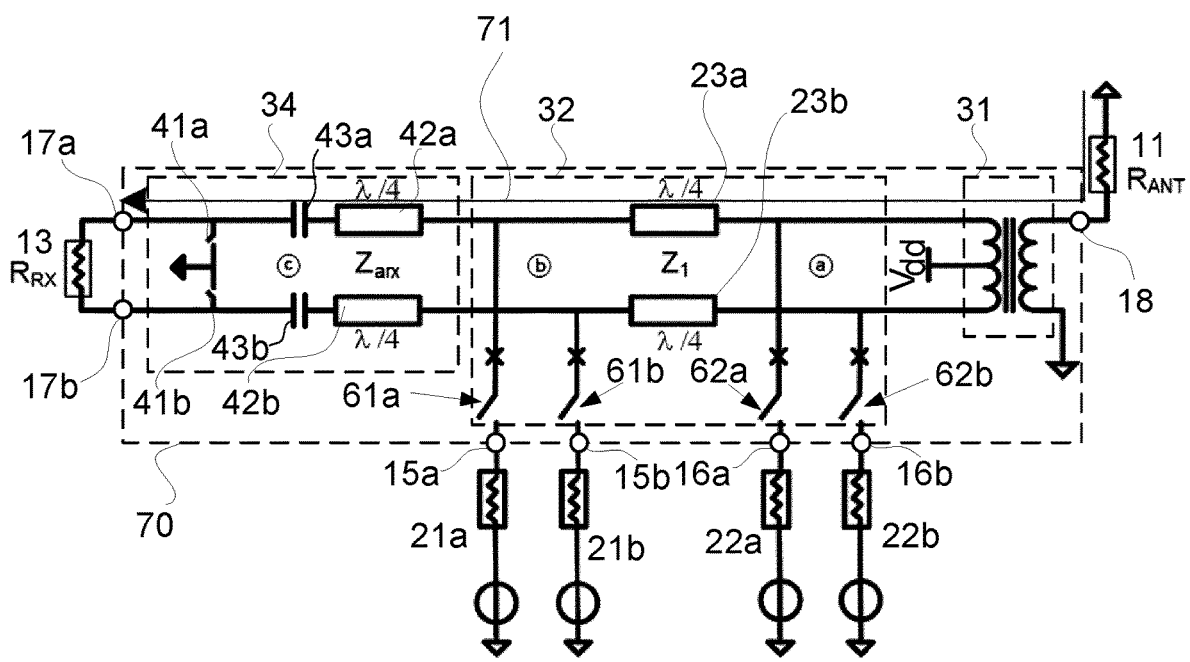
FIG. 7a illustrates the functionality of the differential transceiver switch circuitry 30 in Rx mode.

In FIG. 7a, the functionality of the differential transceiver switch circuitry 30 in Rx mode is shown. The first transmitter switch circuitry 61a, 61b and the second transmitter switch circuitry 62a, 62b are disconnected or open or in an OFF state in the Rx mode. The open switches 61a, 61b, 62a and 62b may be realized by changing the bias level of the common gate transistor of the respective amplifier. DC blocking capacitors 43a and 43b are included to prevent Vdd from reaching the gate of the LNA. As a result, a high impedance is achieved towards the main and auxiliary amplifiers preventing the reception signal 71 to enter the transmitters. Therefore, the reception signals 71 will flow towards the receiver port 17a, 17b.

However, it is also desired that the impedance at the output of the first positive amplifier circuitry 21a and first negative amplifier circuitry 21b should be larger than that at the output of the second positive amplifier circuitry 22a and second negative amplifier circuitry 22b. This is required in order to prevent flow of reception signals 71 towards the first positive amplifier circuitry 21a and first negative amplifier circuitry 21b. The first quarter wavelength, $\lambda/4$, impedance converter 23a and 23b upconverts the impedance level at a node marked as "c". Prevention of flow of reception signals 71 towards the first positive amplifier circuitry 21a and first negative amplifier circuitry 21b thereby improves the receiver insertion loss and the reception signals 71 only passes via the second quarter wavelength, $\lambda/4$, impedance converter 42a and 42b in the Rx mode. It should be noted that the impedance converters 23a and 23b are a part of a Doherty amplifier, which may be reused for as part of the circuit in Rx mode.

Further, In Rx mode, receiver switch circuitry 41a, 41b is open or in an OFF stage preventing the reception signal 71 from shorting to ground.

Figure 7B:
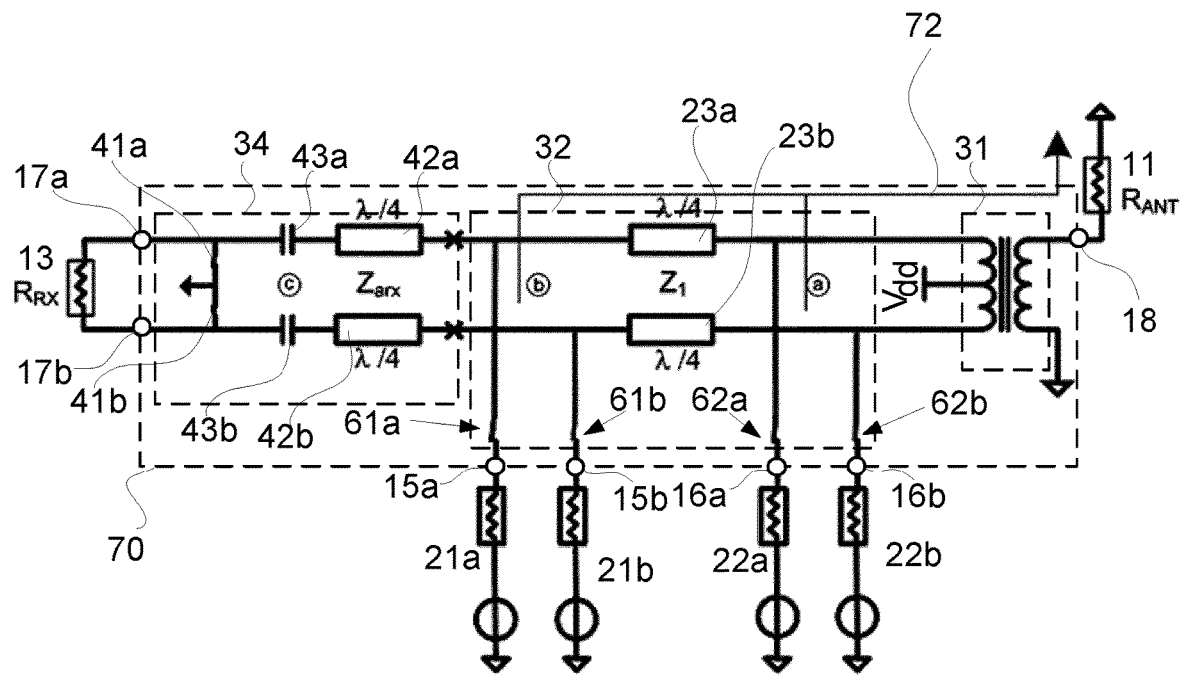
FIG. 7b illustrates the functionality of the differential transceiver switch circuitry 30 in Tx mode.

In FIG. 7b, the functionality of the differential transceiver switch circuitry 30 in a Tx mode is shown. The first positive amplifier circuitry 21a and first negative amplifier circuitry 21b and the second positive amplifier circuitry 22a and second negative amplifier circuitry 22b of the differential transceiver switch circuitry 30 functions like the main and aux amplifiers of a normal Doherty amplifier (such as the Doherty amplifier 25). In the transmission mode, as shown in FIG. 7b, the first transmitter switch circuitry 61a, 61b and the second transmitter switch circuitry 62a, 62b are connected or closed or in an ON state.

Further, the receiver switch circuitries 41a, 41b are closed or in an ON state in Tx mode. The second quarter wavelength, $\lambda/4$, impedance converter 42a and 42b acts as an impedance inverter, which ideally inverts the short created by the receiver switch circuitry 41a, 41b to an open circuit at the side of the second quarter wavelength, $\lambda/4$, impedance converter 42a and 42b that connects the input points 35a and 35b.

As a result, no transmission signals 72 reach the receiver ports 17a and 17b, ideally, because of the open circuit created at the side of the second quarter wavelength, $\lambda/4$, impedance converter 42a and 42b that connects the input points 35a and 35b, thereby reducing the transmission insertion loss. Further, no additional transmission line segment is needed in Tx mode, which helps achieve a very low transmission insertion loss. The transmission insertion loss will be limited to the amount of signal that goes into the first quarter wavelength, λ/4, impedance converter 23a and 23b.

According to some embodiments, the second quarter wavelength, λ/4, impedance converter 42a and 42b has an impedance that matches an impedance of the receiver circuitry 13 to the antenna impedance. According to some embodiments, each first quarter wavelength, λ/4, impedance converter 23a, 23b has an impedance that matches the transmitter impedance to the impedance of the antenna 11.

For example, the transmitter impedance of the antenna is 50Ω, then impedance Z a at node marked as "a" between the first quarter wavelength, λ/4, impedance converter 23 (FIG. 2a, 2b) and the antenna port 18 is Za=25Ω when the balun is 1:2. The impedance $Z_b$ at node marked as "b" is selected to be $Z_b$=100Ω, then the impedance $Z_1$ at the first quarter wavelength, λ/4, impedance converter 23a, 23b is $Z_1$=50Ω since:

$$Z_1 = \sqrt{Z_a \cdot Z_b}$$

For reception, the impedance at the second quarter wavelength, λ/4, impedance converter 42a, 42b may be chosen freely, e.g., but optimum noise impedance is as follows: receiver impedance $R_{RX}$ is 80Ω, then impedance $Z_{arx}$ at the second quarter wavelength, λ/4, impedance converter 42a, 42b is:

$$Z_{arx} = \sqrt{R_{RX} \cdot Z_b}$$

Figure 8A:
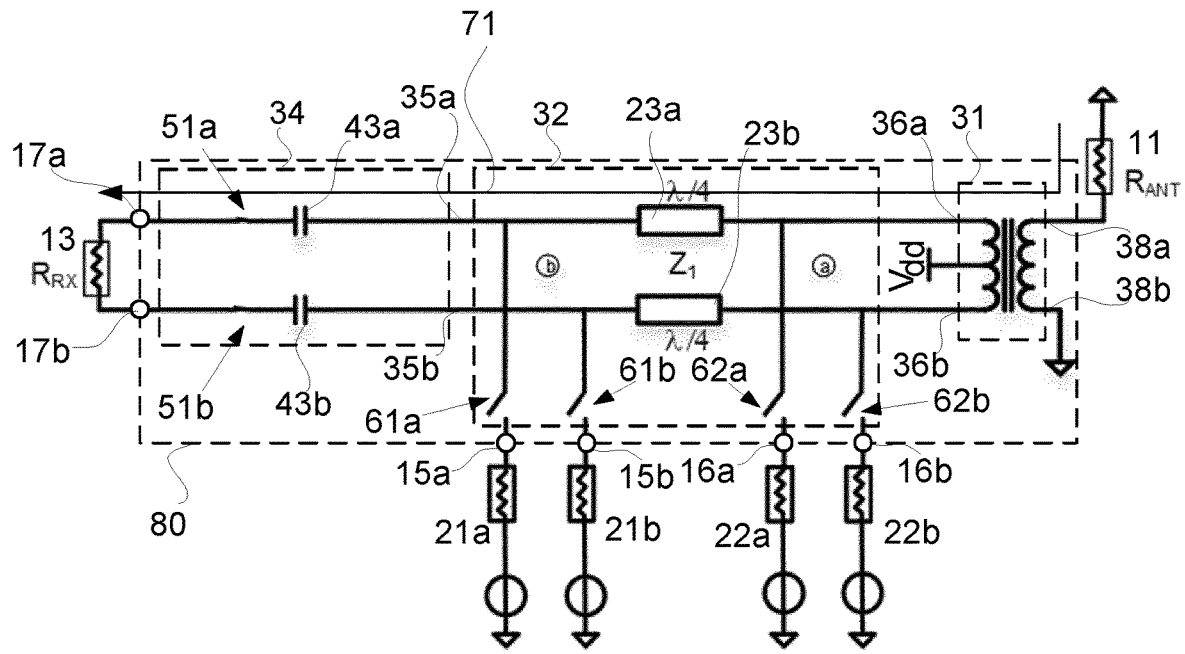
FIG. 8a illustrates an alternate configuration of the differential transceiver switch circuitry in the Rx mode.

In FIG. 8a, an alternate configuration of the differential transceiver switch circuitry 30 in the Rx mode is shown. The second quarter wavelength, λ/4, impedance converter 42a and 42b are removed and the receiver switch circuitry 51a, 51b are placed in series. The receiver switch circuitry 51a, 51b are connected or closed or is in an ON state during the Rx mode. The first transmitter switch circuitry 61a, 61b and the second transmitter switch circuitry 62a, 62b are disconnected or open or in an OFF state in the Rx mode. As a result, a high impedance is achieved at the first and the second side of the first quarter wavelength, λ/4, impedance converter 23a and 23b, i.e. at nodes denoted or marked as "a" and "b" respectively.

Further, the ON state of the receiver switch circuitry 51a, 51b or in other words, since the receiver switch circuitry 51a, 51b are shorted, the reception signals 71 only flows towards the receiver port 17a, 17b.

Figure 8B:
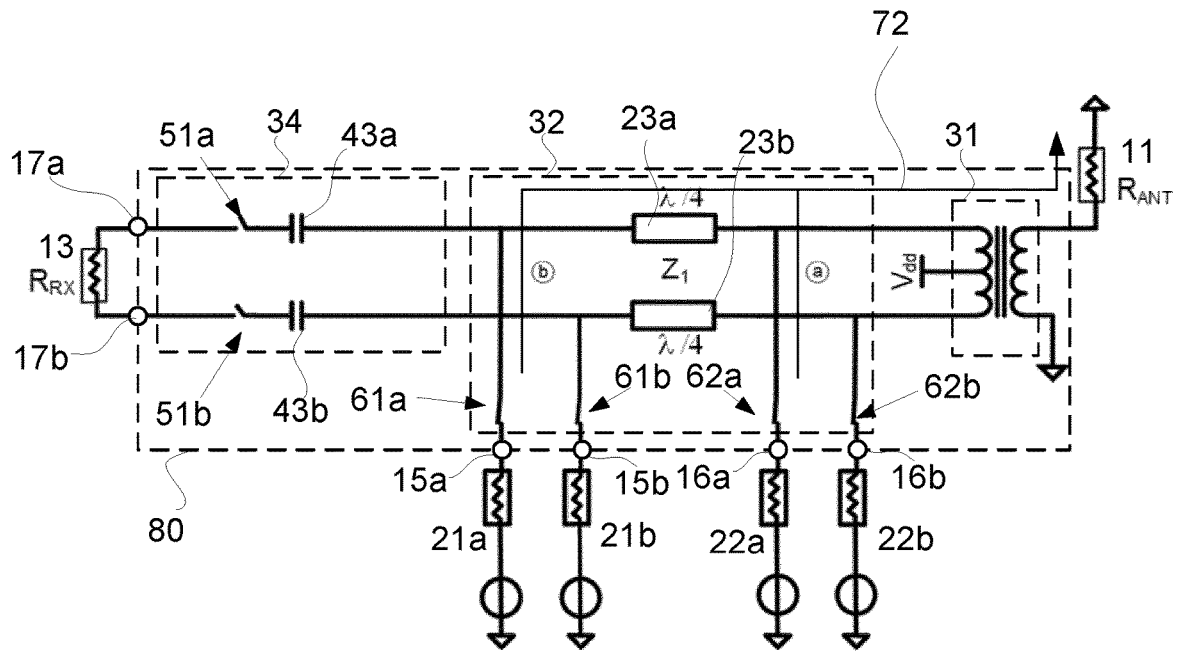
FIG. 8b illustrates an alternate configuration of the differential transceiver switch circuitry in the Tx mode.

In FIG. 8b, an alternate configuration of the differential transceiver switch circuitry 30 in the Tx mode is shown. The second quarter wavelength, λ/4, impedance converter 42a and 42b are removed and the receiver switch circuitry 51a, 51b are placed in series. The receiver switch circuitry 51a, 51b are disconnected or open or in an OFF state during the Tx mode. Since the receiver switch circuitry 51a, 51b are open, the receiver ports 17a and 17b are disconnected.

As a result, no transmission signals 72 reaches the receiver ports 17a and 17b, ideally, because of the open circuit, thereby reducing the transmission insertion loss.

According to some embodiments, each first and second quarter wavelength, λ/4, impedance converter 23a, 23b, 42a, 42b is a transmission line having an electrical length corresponding to λ/4 of the transmission center frequency.

Figure 9A:
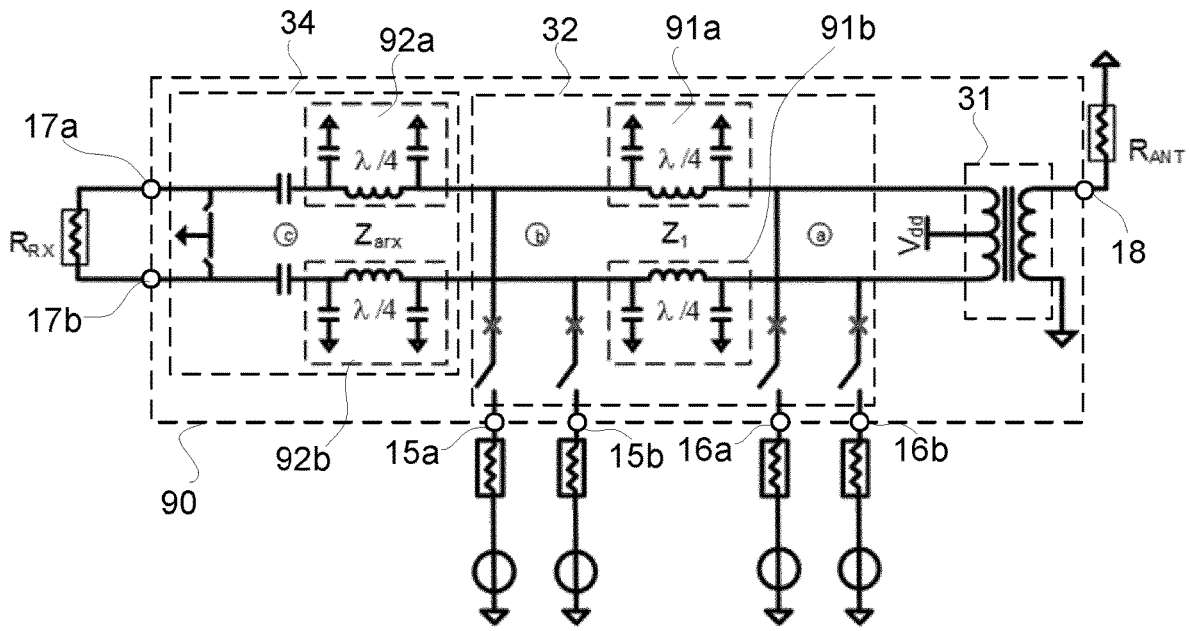
FIG. 9a illustrates an example of the differential transceiver switch comprising passive lumped components.

According to some embodiments, each respective first and second quarter wavelength, λ/4, impedance converter 23a, 23b, 42a, 42b comprises passive lumped components. FIG. 9a below illustrates an example of the differential transceiver switch 30, 70 comprising passive lumped components. With the metal stacks available in current CMOS processes, it is typically not feasible to make good transmission lines with low losses. In addition, even at mm-wave frequencies, the physical length of λ/4 lines is too long to be integrated on-chip. Therefore, integrated transmission line segments in CMOS circuits are typically implemented using passive lumped components, as illustrated in FIG. 9a. These integrated transmission line segments have a limited bandwidth, and the bandwidth of a transmission line may be increased by adding additional transmission line segments, pi and/or T sections, used to implement the required electrical length of the transmission line.

FIG. 9a illustrates an example differential transceiver switch circuitry comprising lumped components. The differential transceiver switch circuitry of FIG. 9 is an implementation of the differential transceiver switch circuitry 30 of FIG. 3 or the differential transceiver switch circuitry 70 of FIG. 7a. The differential transceiver switch circuitry 90 is shown replacing the quarter wavelength, λ/4, impedance converters with lumped components arranged in a single pi section, indicated by 92a, 92b, 91a and 91b, replacing each transmission lines 42a, 42b, 23a and 23b as seen in FIGS. 7a and 7b. FIG. 9a shows the differential transceiver switch 90 in the reception mode similar to FIG. 7a.

The differential transceiver switch circuitry 90 comprises a first quarter wavelength, λ/4, impedance converter implemented as a first pi section 92a and 92b, a second quarter wavelength, λ/4, impedance converter implemented as a second pi section 91a and 91b. The first pi section 92a and 92b and the second pi section 91a and 91b are similar lumped component versions of the first transmission line 23a and 23b and the second transmission line 42a and 42b respectively of FIG. 7a. The first pi section 92a, 92b, in the receive arrangement 34, is arranged between the transmit arrangement 32 and the receiver ports 17a, 17b. In the transmit arrangement, the second pi section 91a, 91b is arranged between the respective at least one second amplifier ports 16a, 16b and the respective first amplifier ports 15a, 15b.

The lumped components comprise at least one inductor, L, and at least one capacitor, C, arranged in at least one pi section. According to some embodiments, a first side of each capacitor C is connected to ground and a first and second side of the at least one inductor L is connected between a second side of each capacitor C. The first and second side of the inductor L constitutes connection points of each pi section. This is illustrated in FIG. 9a, where the lumped components implemented in the differential transceiver switch circuitry 30, comprise one inductor and two capacitors arranged in a single pi section. The bandwidth of the line increases along with the number of passive sections (in this embodiment pi sections) used to implement a transmission line with the required electrical length.

Figure 9B:
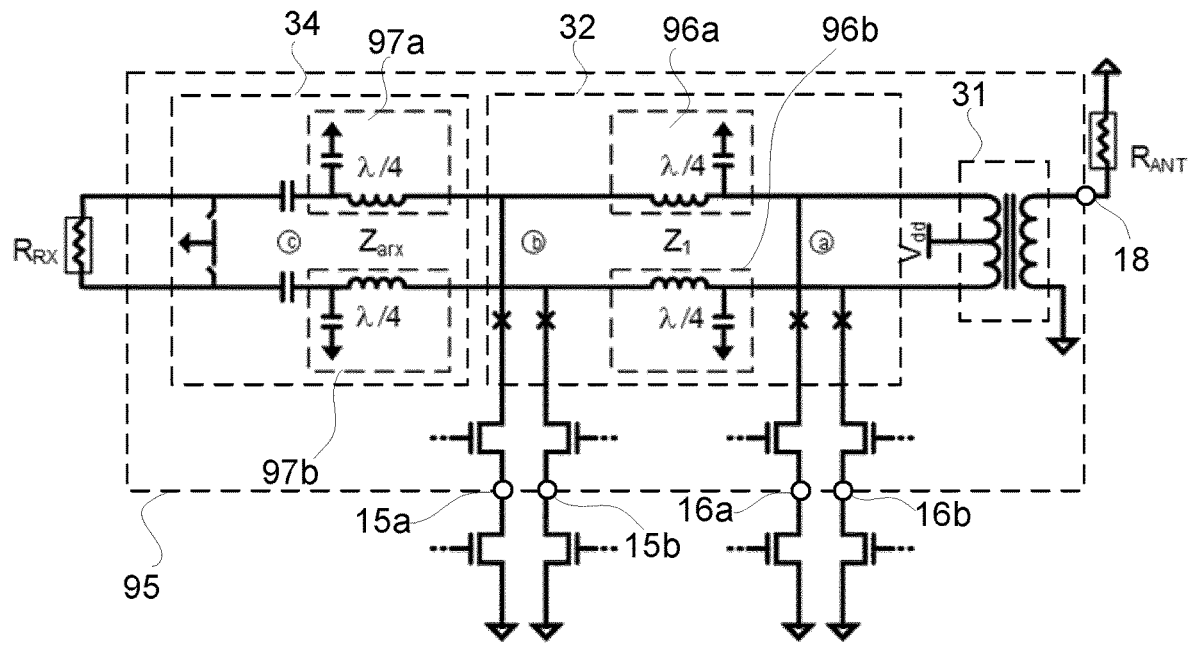
FIG. 9b below illustrates another example of the differential transceiver switch comprising passive lumped components and CMOS devices.

FIG. 9b illustrates another example differential transceiver switch circuitry comprising lumped components and CMOS devices. If the ideal transmit/receive switches 61a, 61b, 62a, 62b shown in FIGS. 7a and 7b are replaced by large CMOS switches, the line characteristics will be affected by the parasitic drain capacitances when the switch is OFF. However, it is desirable to use as large a switch as possible to achieve a low impedance to ground when the switch is ON. This trade-off is achieved if one of the capacitors of the pi-sections 97a, 97b and 96a, 96b are removed and replaced by an appropriately sized CMOS device acting as a switch as shown in FIG. 9b. If the CMOS switch size is chosen carefully, the parasitic drain capacitance to ground will be equal to the capacitance needed by the pi segment to maintain its characteristics. This effectively absorbs the switch capacitance into the structure, making the CMOS switches behave more like ideal switches and improving the circuit performance considerably. As shown in FIG. 9b, the first transmitter switch circuitry 61a, 61b and the second transmitter switch circuitry 62a, 62b are being replaced by CMOS switches.

Figure 10:
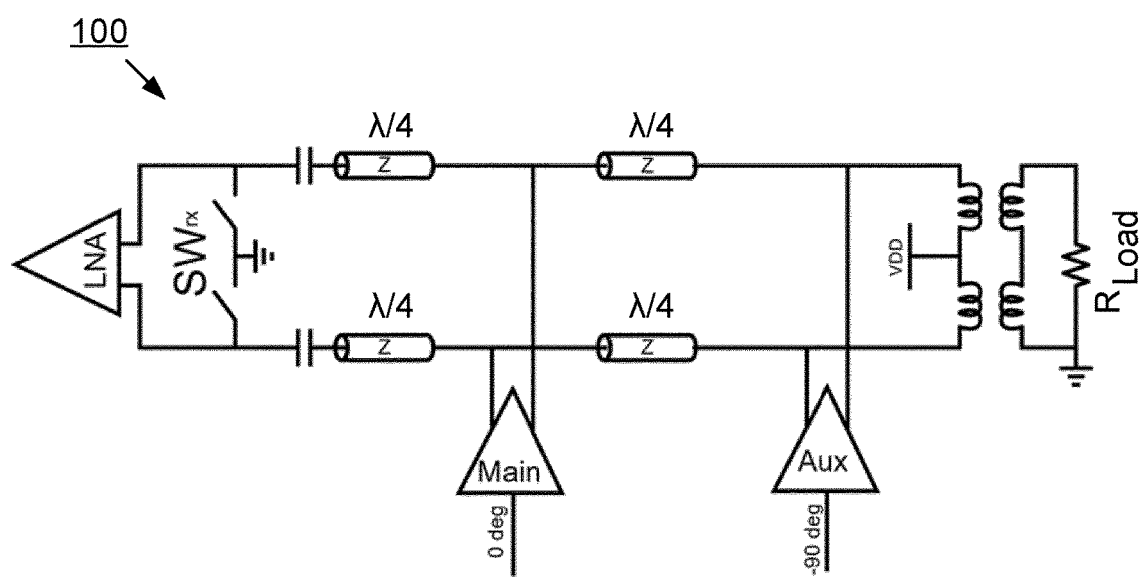
FIG. 10 illustrates a schematic of a transceiver used for simulation.

FIG. 10 illustrates a schematic of a transceiver 100 used for simulation. As seen in the schematic, the transceiver 100 comprises an arrangement of a Doherty amplifier 21 and 22 as a transmit arrangement 32, a low noise amplifier, LNA, as receive arrangement 32, an antenna 11 and the balun 31. The Doherty amplifier is connected to the LNA using a quarter wavelength, λ/4, impedance converter with a transistor switch at the receiver side. The balun 31 comprises an antenna side and a transceiver side. The antenna side comprises a first connection point connectable to the antenna port 18 and a second connection point, which is connectable to a ground potential. The transceiver side comprises a feeding point connectable to a direct current, DC, power supply, Vdd, and two symmetrically arranged transceiver connection points.

The Doherty amplifier of the transceiver 100 operating at 27 GHz is implemented in cadence using Global Foundries, GF, 22 nm fully depleted Silicon on Insulator, FD-SOI, CMOS process. Transmission lines are implemented using lumped L/C components. Inductors are drawn in the upper thick copper metal layers and simulated in ADS momentum. Transistors in the main and auxiliary amplifiers 21a, 21b, 22a and 22b are laid out and extracted views are used for simulations. As a measure for the transmitter insertion loss, the difference between the output power and the output power when operating in transmission mode but without the transmission line connecting to the receiver is used.

Figure 11:
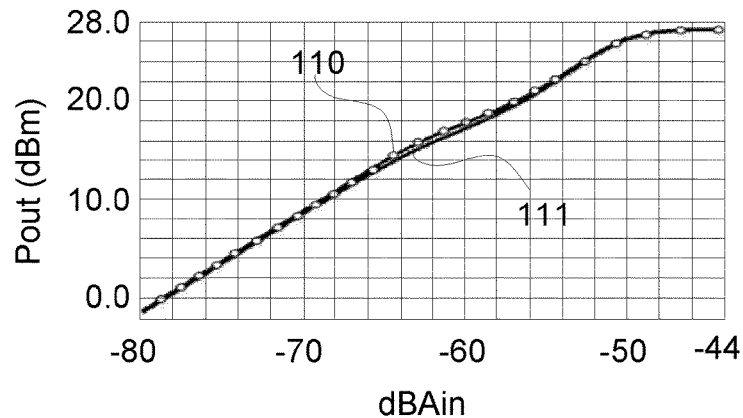
FIG. 11 illustrates simulation results for transmission output power of the transceiver of FIG. 10.

FIG. 11 illustrates simulation results for transmission output power of the transceiver 100 of FIG. 10. The simulation results display the transmission output power with the second quarter wavelength, λ/4, impedance converter 42a, 42b connected indicated by solid curve 111 and without the second quarter wavelength, λ/4, impedance converter 42a, 42b connected indicated by dotted-dashed curve 110.

Figure 12:
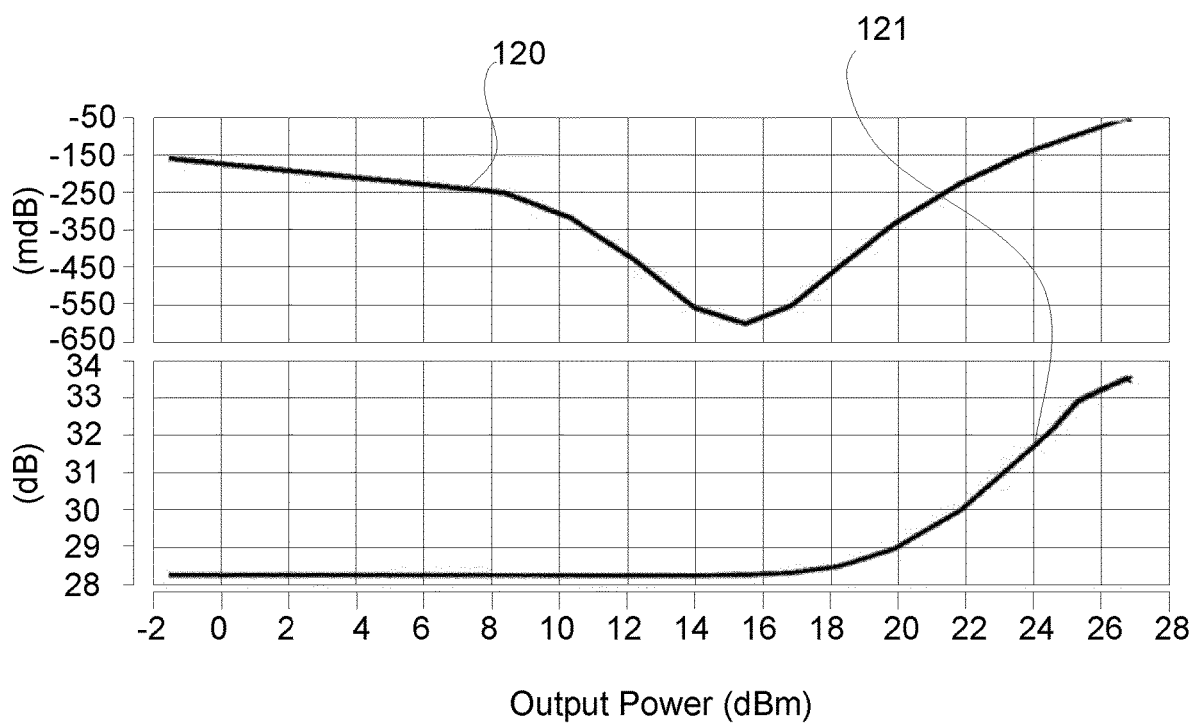
FIG. 12 illustrates simulation of Tx insertion loss and Tx to Rx isolation vs. output power in the transceiver of FIG. 10.

FIG. 12 illustrates transient simulation of Tx insertion loss and Tx to Rx isolation vs. output power in the transceiver 100 of FIG. 10. The simulation results of FIG. 12 display Tx insertion loss indicated by curve 120 and Tx to Rx isolation vs. output power indicated by curve 121, at 27 GHz.

Figure 13:
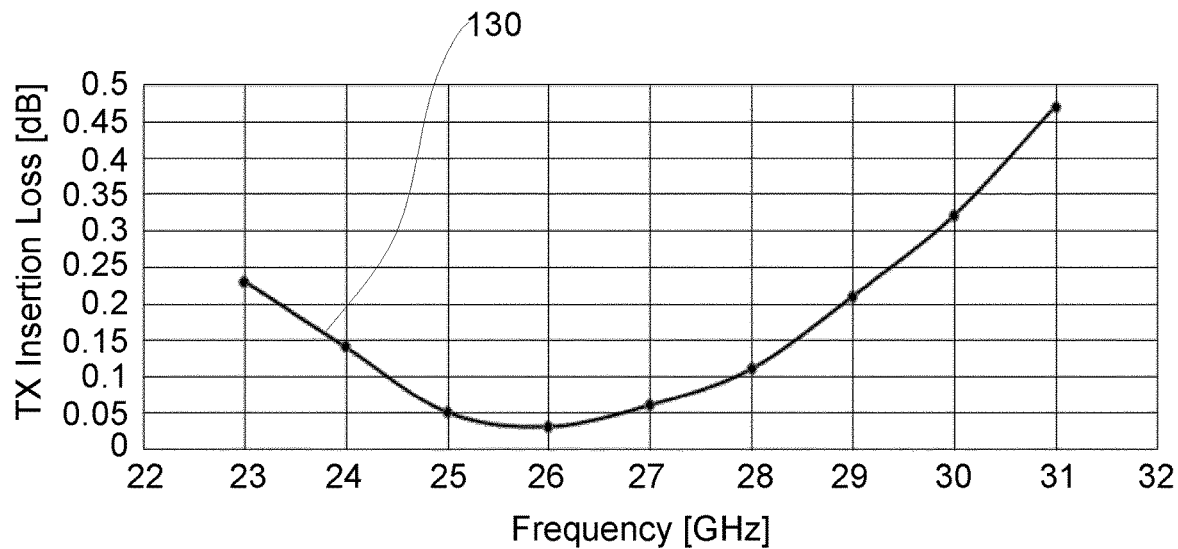
FIG. 13 illustrates simulation results for transmitter insertion loss vs. operating frequency for the transceiver of FIG. 10.

FIG. 13 illustrates simulation results for transmitter insertion loss for the transceiver 100 of FIG. 10. The simulation results display a curve 130 for the transmission insertion loss at Psat (~27 dBm) plotted against frequency.

Figure 14:
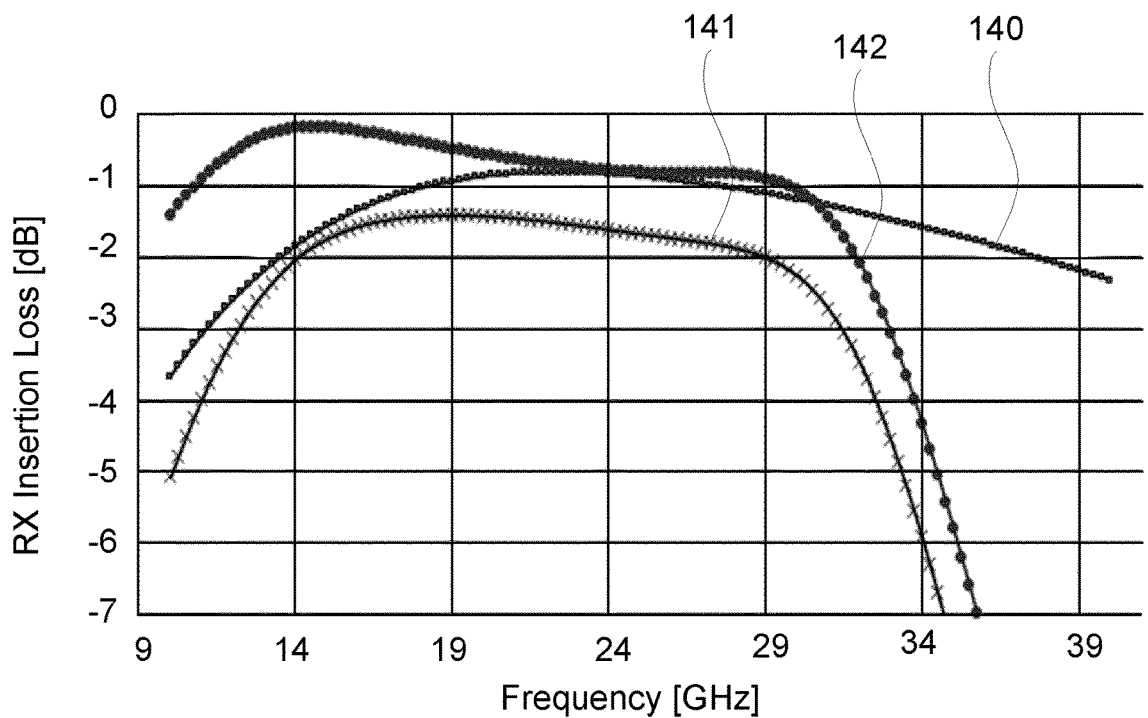
FIG. 14 illustrates simulation results for losses in Rx mode vs. operating frequency of the transceiver of FIG. 10.

FIG. 14 illustrates simulation results for losses in Rx mode of the transceiver 100 of FIG. 10. The simulation results display the characteristics for balun loss indicated by solid curve 140, the antenna to receiver loss indicated by curve 141 and the switch insertion loss in Rx mode indicated by dotted-dashed curve 142.

Figure 15:
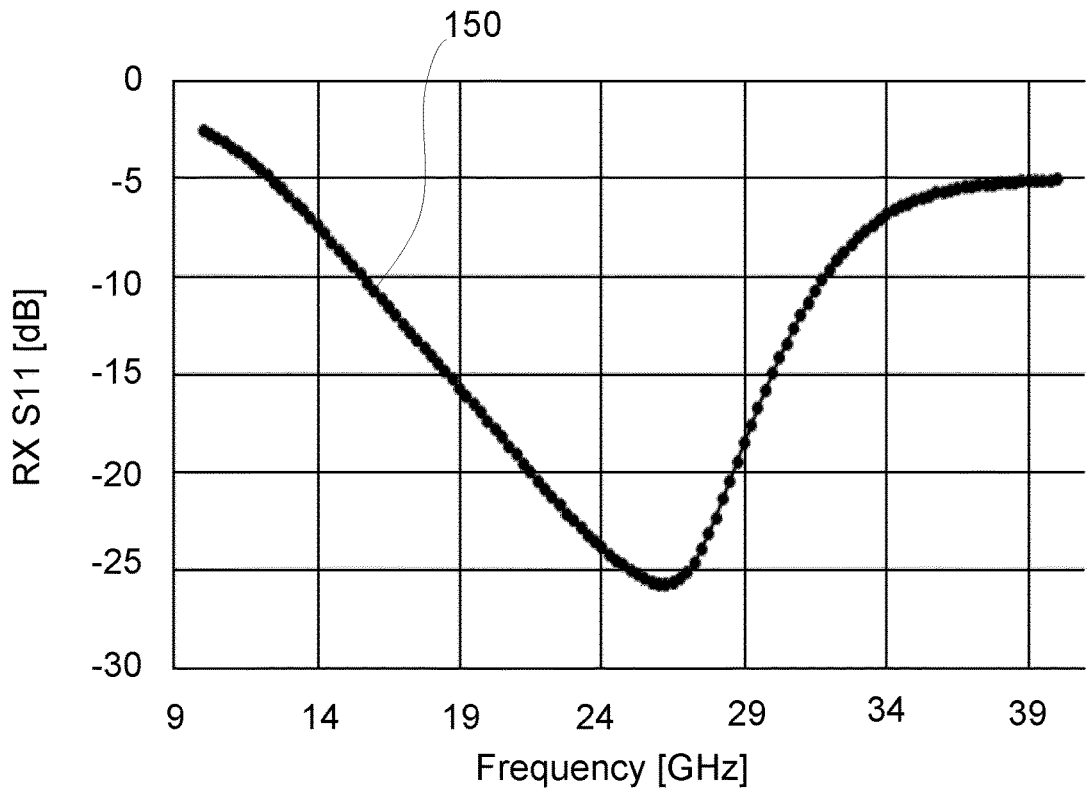
FIG. 15 illustrates simulation result of antenna matching vs. operating frequency, when the transceiver is in Rx mode.

FIG. 15 illustrates simulation result of antenna matching, when the transceiver 100 is in Rx mode, in graphical form. The simulation results of FIG. 15 display the antenna matching characteristics in the reception mode indicated by dotted curve 150.

Figure 16:
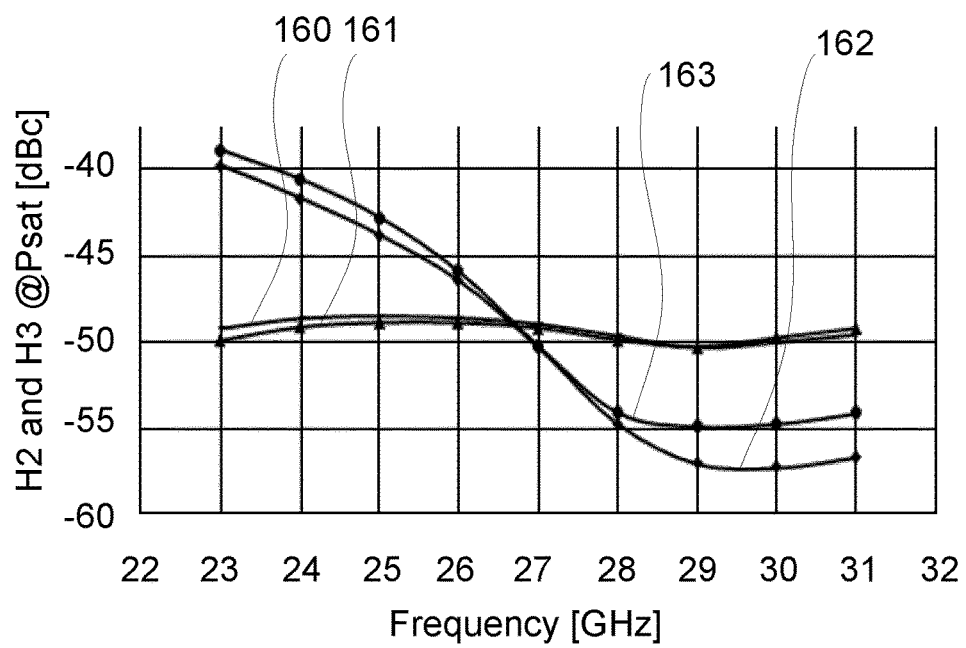
FIG. 16 illustrates a simulation result vs. operating frequency of the second and third order harmonics at saturated output power (Plat) of the transceiver of FIG. 10.

FIG. 16 illustrates a simulation result of the second and third order harmonics at Psat of the transceiver 100 of FIG. 10. Psat is considered at ~27 dBm. The simulation results display second order harmonics (H2) and third order harmonics (H3) with and without the receiver switches implemented. Curve 160 indicates the H2 at Psat without receiver switches and curve 161 indicates the H2 at Psat including receiver switches. Curve 162 indicates the H3 at Psat without receiver switches implemented and curve 163 indicates the H3 at Psat including receiver switches.

Figure 17:
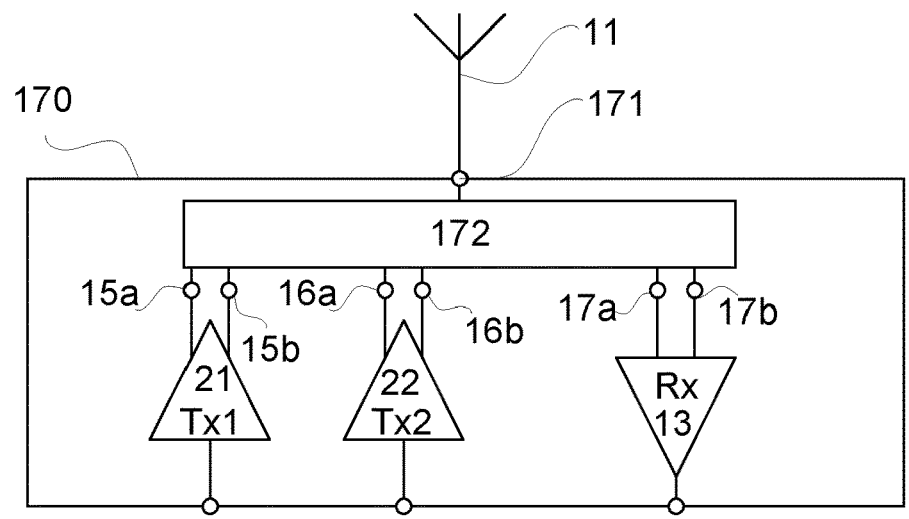
FIG. 17 illustrates a transceiver with a transceiver switch circuitry.

FIG. 17 illustrates a transceiver 170 with a differential transceiver switch circuitry 172 in accordance with some embodiments of the present disclosure. The differential transceiver switch circuitry 172 is illustrated in a transceiver 170 for wireless communication. The differential transceiver switch circuitry 172 is connectable to the antenna 11 via an antenna port 171 for transmitting transmission signals (such as transmission signals 72) during transmission mode, and receiving reception signals (such as reception signals 71) during reception mode.

The transceiver 170 comprises a differential first amplifier 21 connected to positive and negative first amplifier ports 15a, 15b of the differential transceiver switch circuitry and a differential second amplifier 22 connected to positive and negative second amplifier port 16a, 16b of the differential transceiver switch circuitry. The first amplifier and second amplifier are configured to generate transmission signals. The transceiver 160 comprises a receiver (13) connected to positive and negative reception ports 17a, 17b of the differential transceiver switch circuitry and being configured to receive reception signals.

According to some embodiments, the first differential amplifier is a carrier amplifier and the second differential amplifier is a peaking amplifier.

According to some embodiments, the transmit arrangement 32 of the differential transceiver switch circuitry 172 and the first amplifier and second amplifier is a differential Doherty amplifier.

Figure 18:
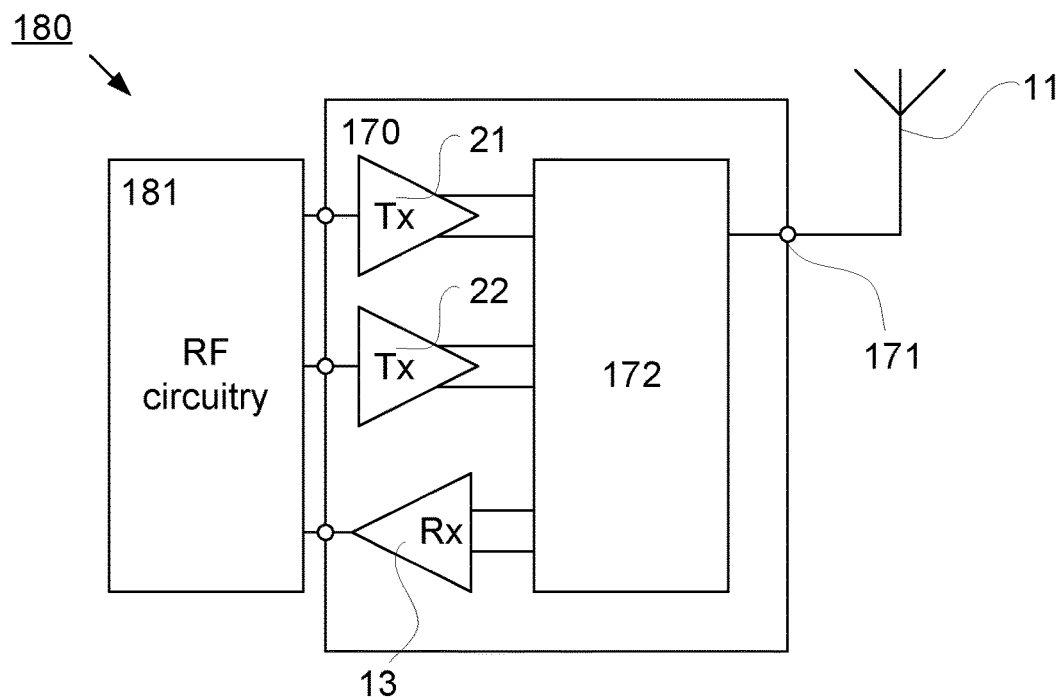
FIG. 18 illustrates an example communication node with a transceiver of FIG. 16.

FIG. 18 illustrates an example communication node 180 with a transceiver 170 of FIG. 17. The communication node 180 comprises the transceiver 170 and a communication arrangement 11 connected to the antenna port 171. The transceiver 170 will work in both a wireless system with an antenna connected to the antenna port 171. Preferably, the communication network is a wireless network and the communication arrangement is an antenna 11. The communication node 180, as an example, may be a wireless device or a base station.

The present disclosure is related to a differential transceiver switch circuitry 30; 70; 90 for a differential transceiver comprising an antenna port 18 connectable to an antenna 11, a positive and a negative receiver port 17a, 17b connectable to a receiver circuitry 13, a first positive and first negative amplifier port 15a, 15b connectable to a respective first positive and first negative amplifier circuitry 21a, 21b, and at least one second positive and negative second amplifier port 16a, 16b connectable to a respective second positive and second negative amplifier circuitry 22a, 22b, wherein the differential transceiver switch circuitry 30; 90 is configured to be operable in a reception mode to allow reception signals 71 at the antenna port 18 to be transferred to the positive and negative receiver port 17a, 17b, and configured to be operable in a transmission mode to allow transmission signals 72 at the first positive and first negative amplifier port 15a, 15b and at the second positive and second negative amplifier port 16a, 16b to be transferred to the antenna port (18) for transmission, the transmission signals 72 having a transmission center frequency with a wavelength, A, and the reception signals 71 having a reception center frequency within ten percent of the transmission center frequency;

The differential transceiver switch circuitry further comprises:

a balun 31 comprising an antenna side and a transceiver side, the antenna side comprising a first connection point 38a connectable to the antenna port 18 and a second connection point 38b which is connectable to a ground potential, and the transceiver side comprising a feeding point 37 connectable to a direct current, DC, power supply, Vdd, and two symmetrically arranged transceiver connection points 36a, 36b;

a transmit arrangement 32 comprising a positive transmission path 33a and a negative transmission path 33b, said positive and negative transmission paths 33a, 33b being symmetrical, each transmission path comprising:

a first quarter wavelength, λ/4, impedance converter 23a, 23b; 91a, 91b; 96a, 96b having a first side connected to a respective one of the two symmetrically arranged transceiver connection points 36a, 36b, a respective first amplifier port 15a, 15b being connected to a second side of the first quarter wavelength, λ/4, impedance converter 23a, 23b; 91a, 91b; 96a, 96b via a first transmitter switch circuitry 61a, 61b, and a respective at least one second amplifier port 16a, 16b being connected to the first side of the first quarter wavelength, λ/4, impedance converter 23a, 23b; 91a, 91b; 96a, 96b via a second transmitter switch circuitry 62a, 62b;

wherein the respective first transmitter switch circuitry 61a, 61b and the respective second transmitter switch circuitry 62a, 62b are configured to disconnect the respective first amplifier ports 15a, 15b and the respective at least one second amplifier ports 16a, 16b from the respective quarter wavelength, λ/4, impedance converter 23a, 23b; 91a, 91b; 96a, 96b in the reception mode; and a receive arrangement 34 connected between the transmit arrangement 32 and the positive receiver port 17a and the negative receiver port 17b, the receive arrangement 32 comprising a receiver switch circuitry 41a, 41b configured to prevent transmission signals to enter the receive arrangement, at least at the transmission center frequency, in the transmission mode.

According to some embodiments, the receive arrangement 34 comprises a positive input point 35a connected to the second side of the first quarter wavelength, λ/4, impedance converter 23a; 91a; 96a of the positive transmission path 33a of the transmit arrangement 32; and a negative input point 35b connected to the second side of the first quarter wavelength, λ/4, impedance converter 23b of the negative transmission path 33b; 91b; 96b of the transmit arrangement 32.

According to some embodiments, the receive arrangement 34 comprises a positive second quarter wavelength, λ/4, impedance converter 42a; 92a; 97a and a negative second quarter wavelength, λ/4, impedance converter 42b; 92b; 97b, each second quarter wavelength, λ/4, impedance converter 42a, 42b; 92a, 92b; 97a, 97b being connected between the respective receiver port 17a, 17b and the respective transmission path 33a, 33b of the transmit arrangement 32.

According to some embodiments, the receiver switch circuitry comprises a positive receiver switch 41a connected between the positive receiver port 17a and the DC power supply, Vdd; and a negative receiver switch 41b connected between the negative receiver port 17b and the DC power supply, Vdd, wherein the positive and negative receiver switches 41a, 41b are configured to be closed in the transmission mode.

According to some embodiments, the receiver switch circuitry comprises a positive receiver switch 41a connected between the positive receiver port 17a and the ground potential; and a negative receiver switch 41b connected between the negative receiver port 17b and the ground potential, wherein the positive and negative receiver switches 41a, 41b are configured to be closed in the transmission mode.

According to some embodiments, the receive arrangement 34 comprises a positive in-line receiver switch 51a connected between the positive receiver port 17a and the respective transmission path 33a, 33b of the transmit arrangement 32; and a negative in-line receiver switch 51b connected between the negative receiver port 17b and the respective transmission path 33a, 33b of the transmit arrangement 32, wherein the positive and negative in-line receiver switches 51a, 51b are configured to be open in the transmission mode.

According to some embodiments, each first quarter wavelength, λ/4, impedance converter 23a, 23b; 91a, 91b; 96a, 96b has an impedance that matches the transmitter impedance to the impedance of the antenna.

According to some embodiments, each first and second quarter wavelength, λ/4, impedance converter 23a, 23b, 42a, 42b is a transmission line having a length corresponding to λ/4 of the transmission center frequency.

According to some embodiments, each first and second quarter wavelength, λ/4, impedance converter 91a, 91b, 92a, 92b; 96a, 96b; 97a, 97b comprises passive lumped components.

According to some embodiments, the lumped components comprise at least one inductor and at least one capacitor arranged in at least one pi or T segment.

According to some embodiments, the reception center frequency is equal to the transmission center frequency.

The present disclosure is related to a differential transceiver 170 for wireless communication comprising:

a differential transceiver switch circuitry 172 as described above being connectable to an antenna 11 via an antenna port 171 for transmitting transmission signals during transmission mode, and receiving reception signals during reception mode;

a differential first amplifier 21 connected to positive and negative first amplifier ports 15a, of the differential transceiver switch circuitry and a differential second amplifier 22 connected to positive and negative second amplifier port 16a, 16b of the differential transceiver switch circuitry, the first amplifier and second amplifier being configured to generate transmission signals; and a receiver 13 connected to positive and negative reception ports 17a, 17b of the differential transceiver switch circuitry and being configured to receive reception signals.

According to some embodiments, the first differential amplifier is a carrier amplifier and the second differential amplifier is a peaking amplifier.

According to some embodiments, the transmit arrangement 32 of the differential transceiver switch circuitry 172 and the first amplifier and second amplifier is a differential Doherty amplifier.

The present disclosure is related to communication node 180 for a communication network comprising a differential transceiver 170 and a communication arrangement connected to an antenna port 171 of the transceiver 170.

According to some embodiments, the communication network is a wireless network and the communication arrangement is an antenna 11.

According to some embodiments, the communication node is a wireless device or a base station.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of transceiver switch circuitry, transceivers and nodes. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, and that several "means", "units" or "devices" may be represented by the same item of hardware.

A "wireless device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as having any number of antennas or antenna elements.

Although the description is mainly given for a transceiver switch circuitry, it should be understood by the skilled in the art that the transceiver switch circuitry is a part of a transceiver which is implemented in any wireless device, terminal, or node capable of receiving in DL and transmitting in UL (e.g. PDA, laptop, mobile, sensor, fixed relay, mobile relay or even a radio base station, e.g. femto base station).

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A differential transceiver switch circuitry for a differential transceiver comprising an antenna port connectable to an antenna, a positive and a negative receiver port connectable to a receiver circuitry, a first positive and a first negative amplifier port connectable to a respective first positive and first negative amplifier circuitry, and at least one second positive and negative second amplifier port connectable to a respective second positive and second negative amplifier circuitry, the differential transceiver switch circuitry being configured to be operable in a reception mode to allow reception signals at the antenna port to be transferred to the positive and negative receiver port, and configured to be operable in a transmission mode to allow transmission signals at the first positive and first negative amplifier port and at the second positive and second negative amplifier port to be transferred to the antenna port for transmission, the transmission signals having a transmission center frequency with a wavelength, $\lambda$, and the reception signals having a reception center frequency within ten percent of the transmission center frequency, the differential transceiver switch circuitry further comprising:
   a balun comprising an antenna side and a transceiver side, the antenna side comprising a first connection point connectable to the antenna port and a second connection point which is connectable to a ground potential, and the transceiver side comprising a feeding point connectable to a direct current, DC, power supply, Vdd, and two symmetrically arranged transceiver connection points;
   a transmit arrangement comprising a positive transmission path and a negative transmission path, said positive and negative transmission paths being symmetrical, each transmission path comprising:
      a first quarter wavelength, $\lambda/4$, impedance converter having a first side connected to a respective one of the two symmetrically arranged transceiver connection points;
      a respective first amplifier port being connected to a second side of the first quarter wavelength, $\lambda/4$, impedance converter via a first transmitter switch circuitry; and
      a respective at least one second amplifier port being connected to the first side of the first quarter wavelength, $\lambda/4$, impedance converter via a second transmitter switch circuitry;
   the respective first transmitter switch circuitry and the respective second transmitter switch circuitry being configured to disconnect the respective first amplifier ports and the respective at least one second amplifier ports from the respective quarter wavelength, $\lambda/4$, impedance converter in the reception mode; and
   a receive arrangement connected between the transmit arrangement and the positive receiver port and the negative receiver port, the receive arrangement comprising a receiver switch circuitry configured to prevent transmission signals from entering the receive arrangement, at least at the transmission center frequency, in the transmission mode.

2. The differential transceiver switch circuitry according to claim 1, wherein the receive arrangement comprises a positive input point connected to the second side of the first quarter wavelength, $\lambda/4$, impedance converter of the positive transmission path of the transmit arrangement; and a negative input point connected to the second side of the first quarter wavelength, $\lambda/4$, impedance converter of the negative transmission path of the transmit arrangement.

3. The differential transceiver switch circuitry according to claim 2, wherein the receive arrangement comprises a positive second quarter wavelength, λ/4, impedance converter and a negative second quarter wavelength, λ/4, impedance converter, each second quarter wavelength, λ/4, impedance converter being connected between the respective receiver port and the respective transmission path of the transmit arrangement.

4. The differential transceiver switch circuitry according to claim 2, wherein the receive arrangement comprises a positive in-line receiver switch connected between the positive receiver port and the respective transmission path of the transmit arrangement; and a negative in-line receiver switch connected between the negative receiver port and the respective transmission path of the transmit arrangement, wherein the positive and negative in-line receiver switches are configured to be open in the transmission mode.

5. The differential transceiver switch circuitry according to claim 2, wherein each first quarter wavelength, λ/4, impedance converter has an impedance that matches the transmitter impedance to the impedance of the antenna.

6. The differential transceiver switch circuitry according to claim 1, wherein the receive arrangement comprises a positive second quarter wavelength, λ/4, impedance converter and a negative second quarter wavelength, λ/4, impedance converter, each second quarter wavelength, λ/4, impedance converter being connected between the respective receiver port and the respective transmission path of the transmit arrangement.

7. The differential transceiver switch circuitry according to claim 6, wherein the receiver switch circuitry comprises a positive receiver switch connected between the positive receiver port and the DC power supply, Vdd; and a negative receiver switch connected between the negative receiver port and the DC power supply, Vdd, wherein the positive and negative receiver switches are configured to be closed in the transmission mode.

8. The differential transceiver switch circuitry according to claim 6, wherein the receiver switch circuitry comprises a positive receiver switch connected between the positive receiver port and the ground potential; and a negative receiver switch connected between the negative receiver port and the ground potential, wherein the positive and negative receiver switches are configured to be closed in the transmission mode.

9. The differential transceiver switch circuitry according to claim 1, wherein the receive arrangement comprises a positive in-line receiver switch connected between the positive receiver port and the respective transmission path of the transmit arrangement; and a negative in-line receiver switch connected between the negative receiver port and the respective transmission path of the transmit arrangement, wherein the positive and negative in-line receiver switches are configured to be open in the transmission mode.

10. The differential transceiver switch circuitry according to claim 1, wherein each first quarter wavelength, λ/4, impedance converter has an impedance that matches the transmitter impedance to the impedance of the antenna.

11. The differential transceiver switch circuitry according to claim 1, wherein each first and second quarter wavelength, λ/4, impedance converter is a transmission line having a length corresponding to λ/4 of the transmission center frequency.

12. The differential transceiver switch circuitry according to claim 1, wherein each first and second quarter wavelength, λ/4, impedance converter comprises passive lumped components.

13. The differential transceiver switch circuitry according to claim 12, wherein the lumped components comprise at least one inductor and at least one capacitor arranged in at least one pi or T segment.

14. The differential transceiver switch circuitry according to claim 1, wherein the reception center frequency is equal to the transmission center frequency.

15. A differential transceiver for wireless communication comprising:
a differential transceiver switch circuitry connectable to an antenna via an antenna port configured to transmit transmission signals during transmission mode, and receiving reception signals during reception mode, the differential transceiver switch circuitry comprising:
a balun comprising an antenna side and a transceiver side, the antenna side comprising a first connection point connectable to the antenna port and a second connection point which is connectable to a ground potential, and the transceiver side comprising a feeding point connectable to a direct current, DC, power supply, Vdd, and two symmetrically arranged transceiver connection points;
a transmit arrangement comprising a positive transmission path and a negative transmission path, said positive and negative transmission paths being symmetrical, each transmission path comprising:
a first quarter wavelength, λ/4, impedance converter having a first side connected to a respective one of the two symmetrically arranged transceiver connection points;
a respective first amplifier port being connected to a second side of the first quarter wavelength, λ/4, impedance converter via a first transmitter switch circuitry; and
a respective at least one second amplifier port being connected to the first side of the first quarter wavelength, λ/4, impedance converter via a second transmitter switch circuitry;
the respective first transmitter switch circuitry and the respective second transmitter switch circuitry being configured to disconnect the respective first amplifier ports and the respective at least one second amplifier ports from the respective quarter wavelength, λ/4, impedance converter in the reception mode; and
a receive arrangement connected between the transmit arrangement and the positive receiver port and the negative receiver port, the receive arrangement comprising a receiver switch circuitry configured to prevent transmission signals from entering the receive arrangement, at least at the transmission center frequency, in the transmission mode;
a differential first amplifier connected to positive and negative first amplifier ports of the differential transceiver switch circuitry and a differential second amplifier connected to positive and negative second amplifier port of the differential transceiver switch circuitry, the first amplifier and second amplifier being configured to generate transmission signals; and
a receiver connected to positive and negative reception ports of the differential transceiver switch circuitry and being configured to receive reception signals.

16. The differential transceiver according to claim 15, wherein the first differential amplifier is a carrier amplifier and the second differential amplifier is a peaking amplifier.

17. The differential transceiver according to claim 15, wherein the transmit arrangement of the differential transceiver switch circuitry and the first amplifier and second amplifier is a differential Doherty amplifier.

18. A communication node for a communication network comprising:
- a differential transceiver, the differential transceiver comprising:
  - a differential transceiver switch circuitry connectable to an antenna via an antenna port configured to transmit transmission signals during transmission mode, and receiving reception signals during reception mode, the differential transceiver switch circuitry comprising:
    - a balun comprising an antenna side and a transceiver side, the antenna side comprising a first connection point connectable to the antenna port and a second connection point which is connectable to a ground potential, and the transceiver side comprising a feeding point connectable to a direct current, DC, power supply, Vdd, and two symmetrically arranged transceiver connection points;
    - a transmit arrangement comprising a positive transmission path and a negative transmission path, said positive and negative transmission paths being symmetrical, each transmission path comprising:
      - a first quarter wavelength, $\lambda/4$, impedance converter having a first side connected to a respective one of the two symmetrically arranged transceiver connection points;
      - a respective first amplifier port being connected to a second side of the first quarter wavelength, $\lambda/4$, impedance converter via a first transmitter switch circuitry; and
      - a respective at least one second amplifier port being connected to the first side of the first quarter wavelength, $\lambda/4$, impedance converter via a second transmitter switch circuitry;

the respective first transmitter switch circuitry and the respective second transmitter switch circuitry being configured to disconnect the respective first amplifier ports and the respective at least one second amplifier ports from the respective quarter wavelength, $\lambda/4$, impedance converter in the reception mode; and
    - a receive arrangement connected between the transmit arrangement and the positive receiver port and the negative receiver port, the receive arrangement comprising a receiver switch circuitry configured to prevent transmission signals from entering the receive arrangement, at least at the transmission center frequency, in the transmission mode;
  - a differential first amplifier connected to positive and negative first amplifier ports of the differential transceiver switch circuitry and a differential second amplifier connected to positive and negative second amplifier port of the differential transceiver switch circuitry, the first amplifier and second amplifier being configured to generate transmission signals; and
  - a receiver connected to positive and negative reception ports of the differential transceiver switch circuitry and being configured to receive reception signals; and
- a communication arrangement connected to an antenna port of the transceiver.

19. The communication node according to claim 18, wherein the communication network is a wireless network and the communication arrangement is an antenna.

20. The communication node according to claim 19, wherein the communication node is a wireless device or a base station.

* * * * *